(12) United States Patent
Douceur et al.

(10) Patent No.: US 7,958,176 B2
(45) Date of Patent: Jun. 7, 2011

(54) IDENTIFYING FILTER COEFFICIENTS

(75) Inventors: John R. Douceur, Bellevue, WA (US); Robert P. Fitzgerald, Redmond, WA (US); John W. Miller, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 1448 days.

(21) Appl. No.: 11/407,639

(22) Filed: Apr. 20, 2006

(65) Prior Publication Data
US 2006/0247908 A1 Nov. 2, 2006

Related U.S. Application Data

(63) Continuation of application No. 10/668,764, filed on Sep. 23, 2003, now Pat. No. 7,181,736.

(51) Int. Cl.
*G06F 17/10* (2006.01)

(52) U.S. Cl. ...................................... 708/300

(58) Field of Classification Search ........... 708/300–322
See application file for complete search history.

(56) References Cited

U.S. PATENT DOCUMENTS

| | | | | |
|---|---|---|---|---|
| 4,377,793 A | 3/1983 | Horna | ........................... | 333/165 |
| 4,672,567 A | 6/1987 | Kelly et al. | ................... | 702/158 |
| 5,018,202 A * | 5/1991 | Takahashi et al. | ........... | 381/71.5 |
| 5,062,055 A | 10/1991 | Chinnaswamy et al. | ..... | 702/182 |
| 5,212,794 A | 5/1993 | Pettis et al. | ................... | 717/153 |
| 5,392,315 A | 2/1995 | Laud | ............................. | 375/232 |
| 5,432,816 A | 7/1995 | Gozzo | .......................... | 375/232 |
| 5,664,191 A | 9/1997 | Davidson et al. | ............. | 718/100 |
| 5,721,917 A | 2/1998 | Elliott et al. | .................. | 718/101 |
| 5,737,254 A * | 4/1998 | Lane et al. | ..................... | 708/320 |
| 5,889,999 A | 3/1999 | Breternitz, Jr. et al. | ....... | 717/158 |
| 6,658,648 B1 | 12/2003 | Douceur et al. | .............. | 395/701 |
| 7,181,736 B2 | 2/2007 | Douceur et al. | .............. | 719/311 |

* cited by examiner

*Primary Examiner* — Tan V Mai
(74) *Attorney, Agent, or Firm* — Merchant & Gould

(57) ABSTRACT

Techniques for identifying coefficients are described. A technique collects sample input values to the filter and identifies desired output values from the filter for the collected sample input values. The technique then generates a power spectrum of the collected sample input values and a power spectrum of the identified desired output values. The technique then calculates the difference between the generated power spectra. Finally, the technique identifies coefficients that yield a filter transfer function that closely approximates the calculated differences. A technique identifies coefficients for a finite impulse response filter. The technique collects sample input values for a function and identifies desired output values for the filter for the collected sample input values. The technique then approximates the output values from the input values using a linear fitting technique. Finally, the technique sets the coefficients to values obtained from the linear-fitting technique.

18 Claims, 28 Drawing Sheets

IDENTIFYING FILTER COEFFICIENTS

RELATED APPLICATIONS

This patent application is related to U.S. Pat. No. 6,269,477, issued Jul. 31, 2003, entitled "Method and System for Improving the Layout of a Program Image Using Clustering" and U.S. Pat. No. 6,381,740 B1, issued Apr. 30, 2002, entitled "Method and System for Incrementally Improving a Program Layout," which are being filed concurrently and are hereby incorporated by reference. This application is a continuation of application Ser. No. 10/668,764, filed Sep. 23, 2003, which is a continuation of U.S. Pat. No. 6,658,648 B1, issued Dec. 2, 2003, which application(s) are incorporated herein by reference.

TECHNICAL FIELD

This invention relates to a method and system for optimizing a computer program image and, more particularly, to a method and system for rearranging code portions of the program image to reduce the working set.

BACKGROUND OF THE INVENTION

Many conventional computer systems utilize virtual memory. Virtual memory provides a logical address space that is typically larger than the corresponding physical address space of the computer system. One of the primary benefits of using virtual memory is that it facilitates the execution of a program without the need for all of the program to be resident in main memory during execution. Rather, certain portions of the program may reside in secondary memory for part of the execution of the program. A common technique for implementing virtual memory is paging; a less popular technique is segmentation. Because most conventional computer systems utilize paging instead of segmentation, the following discussion refers to a paging system, by these techniques can be applied to segmentation systems or systems employing paging and segmentation as well.

When paging is used, the logical address space is divided into a number of fixed-size blocks, known as pages. The physical address space is divided into like-sized blocks, known as page frames. A paging mechanism maps the pages from the logical address space, for example, secondary memory, into the page frames of the physical address space, for example, main memory. When the computer system attempts to reference an address on a page that is not present in main memory, a page fault occurs. After a page fault occurs, the operating system copies the page into main memory from secondary memory and then restarts the instruction that caused the fault.

One paging model that is commonly used to evaluate the performance of paging is the working set model. At any instance in time, t, there exists a working set, w(k, t), consisting of all the pages used by the k most recent memory references. The operating system monitors the working set of each process and allocates each process enough page frames to contain the process' working set. If the working set is larger than the number of allocated page frames, the system will be prone to thrashing. Thrashing refers to very high paging activity in which pages are regularly being swapped from secondary memory into the pages frames allocated to a process. This behavior has a very high time and computational overhead. It is therefore desirable to reduce the size of (i.e., the number of pages in) a program's working set to lessen the likelihood of thrashing and significantly improve system performance.

A programmer typically writes source code without any concern for how the code will be divided into pages when it is executed. Similarly, a compiler program translates the source code into relocatable machine instructions and stores the instructions as object code in the order in which the compiler encounters the instructions in the source code. The object code therefore reflects the lack of concern for the placement order by the programmer. A linker program then merges related object code together to produce executable code. Again, the linker program has no knowledge or concern for the working set of the resultant executable code. The linker program merely orders the instructions within the executable code in the order in which the instructions are encountered in the object code. The computer program and linker program do not have the information required to make a placement of code within an executable module to reduce the working set. The information required can in general only be obtained by actually executing the executable module and observing its usage. Clearly this cannot be done before the executable module has been created. The executable module initially created by the compiler and linker thus is laid out without regard to any usage pattern.

As each portion of code is executed, the page in which it resides must be in physical memory. Other code portions residing on the same page will also be in memory, even if they may not be executed in temporal proximity. The result is a collection of pages in memory with some required code portions and some unrequired code portions. To the extent that unrequired code portions are loaded into memory, valuable memory space may be wasted, and the total number of pages loaded into memory may be much larger than necessary.

To make a determination as to which code portions are "required" and which code portions are "unrequired," a developer needs execution information for each code portion, such as when the code portion is accessed during execution of the computer program. A common method for gathering such execution information includes adding instrumentation code to every basic block of a program image. A basic block is a portion of code such that if one instruction of the basic block is executed then every instruction is also executed. The execution of the computer program is divided into a series of time intervals (e.g., 500 milliseconds). Each time a basic block is executed during execution of the computer program, the instrumentation code causes a flag to be set for that basic block for the current time interval. Thus, after execution of the computer program, each basic block will have a temporal usage vector ("usage vector") associated with it. The usage vector for a basic block has, for each time interval, a bit that indicates whether that basic block was executed during that time interval. The usage vectors therefore reflect the temporal usage pattern of the basic blocks.

After the temporal usage patterns have been measured, a paging optimizer can rearrange the basic blocks to minimize the working set. In particular, basic blocks with similar temporal usage patterns can be stored on the same page. Thus, when a page is loaded into main memory, it contains basic blocks that are likely to be required.

The minimization of the working set is an NP-complete problem, that is, no polynomial-time algorithm is known for solving the problem. Thus, is the time needed to minimize the working set of a program image generally increases exponentially as the number of code portions increase (i.e., $O(e^n)$, where n is the number of code portions). Because complex program images can have thousands, and even hundreds of thousands, of code portions, such an algorithm cannot generate a minimum working set in a timely manner even when the most powerful computers are employed. Because the use of such algorithms are impractical for all but the smallest program images, various algorithms are needed to generate a layout that results in an improved working set (albeit not necessarily the minimal working set) in a timely manner.

SUMMARY OF THE INVENTION

The present invention provides a method and system for improving the working set of a program image. The working set (WS) improvement system of the present invention employs a two-phase technique for improving the working set. In the first phase, the WS improvement system inputs the program image and outputs a program image with the locality of its references improved. In the second phase, the WS improvement system inputs the program image with its locality of references improved and outputs a program image with the placement of its basic blocks in relation to page boundaries improved so that the working set is reduced.

The present invention provides a technique for evaluating the locality of references for a layout of a computer program. The technique calculates a metric value indicating a working set size of the layout when the layout is positioned to start at various different memory locations within a page. This technique then combines the calculated metric values as an indication of the locality of references of the layout of the computer program. By combining the calculated metric values, the effect of page boundaries on the working set size is averaged and the combined metric value represents the effects of the locality of references or the working set size.

The present invention provides a technique for estimating the rate of improvement in the working set for a plurality of incrementally improved layouts of a computer program. The technique estimates the change in working set size from one incrementally improved layout to the next incrementally improved layout and estimates the time needed to incrementally improve the layout. The technique then combines the estimated change in working set size with the estimated time needed to incrementally improve the working set for that layout to estimate the rate of improvement. By separately estimating the change in working set size and the time needed to incrementally improve the working set, different estimation techniques that are appropriate to the data being estimated can be used.

The present invention provides a technique for identifying coefficients for a filter for filtering results of a function. The technique collects sample input values to the filter and identifies desired output values from the filter for the collected sample input values. The technique then generates a power spectrum of the collected sample input values and a power spectrum of the identified desired output values. The technique then calculates the difference between the generated power spectra. Finally, the technique identifies coefficients that yield a filter transfer function that closely approximates the calculated differences. The present invention also provides a technique for identifying coefficients for a finite impulse response filter. The technique collects sample input values for a function and identifies desired output values for the filter for the collected sample input values. The technique then approximates the output values from the input values using a linear fitting technique. Finally, the technique sets the coefficients to values obtained from the linear-fitting technique. When the input and output values represent the rate of change in working set size resulting from sample runs of the WS improvement system, then the filter can be used to estimate the rate of change dynamically as the improvement process proceeds.

DETAILED DESCRIPTION OF THE INVENTION

I. Overview

Figure 1:
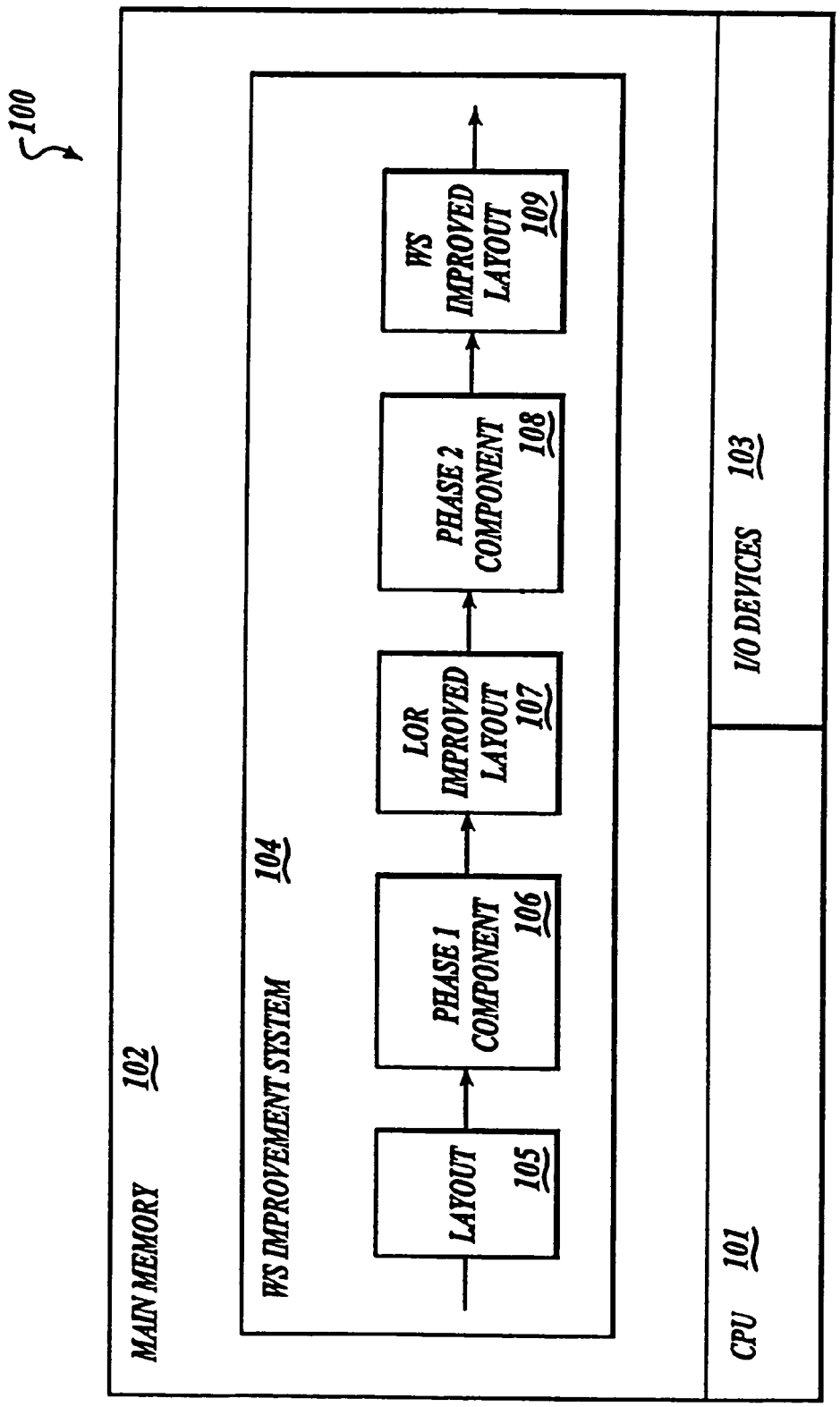
FIG. 1 is a high-level block diagram of a computing environment in which various aspects of the present invention may be implemented.

The present invention provides a method and system for improving the working set of a program image. The working set (WS) improvement system of the present invention employs a two-phase technique for improving the working set. In the first phase, the WS improvement system inputs the program image and outputs a program image with the locality of its references improved. In the second phase, the WS improvement system inputs the program image with its locality of references improved and outputs a program image with the placement of its basic blocks in relation to page boundaries improved so that the working set is reduced.

In the first phase, the WS improvement system generates various different layouts of the program image. The WS improvement system uses a locality of reference (LOR) metric function to evaluate the locality of the references of each layout. The WS improvement system then selects the layout with the best locality of references, as indicated by the LOR metric function, to process in the second phase. The present invention provides a layout number selection technique by which the number of the different layouts that are generated can be selected to balance the trade-off between the computational resources needed to generate additional layouts and the expected improvement in the resulting working set if the additional layouts are generated. In particular, the layout number selection technique for selecting the number of different layout analyzes the results of using the WS improvement system to improve the working set of various sample program images. The technique uses the LOR metric function to evaluate the locality of references of the layouts output by the first phase and uses a working set (WS) metric function to evaluate the working set of the layout output by the second phase. The technique correlates the metric values for the locality of references to the metric values for the working set. Based on this correlation, the layout number selection technique selects a number of layouts such that, if one more layout were to be generated, the computational expense of generating and evaluating that additional layout would not be worth the expected resulting improvement in the working set.

In the second phase, the WS improvement system incrementally improves the layout output by the first phase. The WS improvement system repeatedly modifies the layout of the program image to improve its working set. The WS improvement system uses the WS metric function to evaluate the working set after each incremental improvement of the layout. The present invention provides various termination conditions for determining when to terminate the incremental improvements of the layout. In one termination condition, referred to as the rate of improvement (ROI) termination condition, if the rate of improvement in the working set from one incrementally improved layout to the next falls below a threshold rate, then the WS improvement system terminates the incremental improvement of the second phase. The present invention also provides a ROI selection technique for selecting an algorithm to calculate the rate of improvement in the working set for the incrementally improved layouts.

FIG. 1 is a high-level block diagram of a computing environment in which various aspects of the present invention may be implemented. Although not required, the implementations are described in the general context of computer executable instructions, such as modules, being executed by a personal computer. Generally, program modules include routines, programs, objects, components, and data structures that perform a particular task or manipulate and implement particular abstract data types. Moreover, those skilled in the art will appreciate that the invention may be practiced with other computer system configurations, including, multiprocessor systems, network PCs, mini-computers, mainframe computers, and similar computers. The invention may also be practiced in a distributed computing environment where tasks are performed by remote processing devices that are linked through a communications network. In such an environment, program modules may be located in both local and remote memory storage devices.

With reference to FIG. 1, an exemplary system includes a general purpose computing device 100 in the form of a conventional personal computer that includes a central processing unit 101, a memory 102, and various input/output devices 103. The memory includes read-only memory and random access memory. The personal computer includes storage devices such as a magnetic disk, an optical disk, or a CD-ROM. It will be appreciated by those skilled in the art that other types of computer-readable storage device (i.e., medium) may be used such as magnetic cassettes, flash memory cards, digital video disks, Bernoulli cartridges, random access memories, and read-only memories.

A number of different programs may be stored on the storage devices including an operating system, application programs, and the WS improvement system. The operating system and WS improvement system are loaded into memory for execution by the central processing unit. The WS improvement system includes a phase 1 component 106 and a phase 2 component 108. The phase 1 component inputs a layout 105 of a program image and outputs a layout 107 of the program image with the locality of its references improved. The phase 2 component inputs the layout with the locality of references improved and outputs a layout 109 of the program image with its working set improved.

Figure 2:
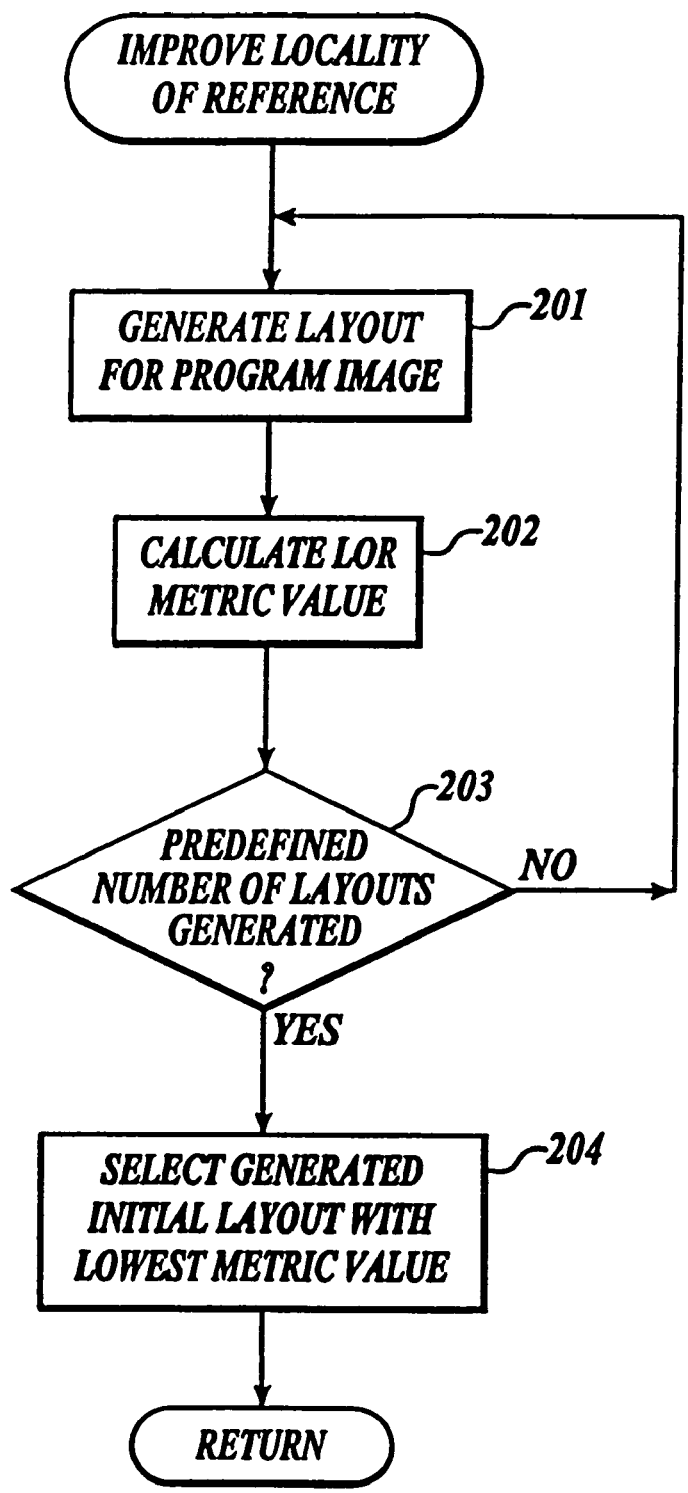
FIG. 2 is a high-level flow diagram of an implementation of a routine to improve the locality of references of a layout of a program image.

FIG. 2 is a high-level flow diagram of an implementation of a routine to improve the locality of references of a layout of a program image. This routine is an implementation of the phase 1 component. The routine loops generating various layouts of the program image whose locality of references is to be improved. The number of layouts to generate is predefined by the layout number selection technique. The routine calculates a metric value, referred to as the locality of reference (LOR) metric value, that rates the various layouts based on their locality of references. The routine then returns the generated layout having the best locality of references, which is the layout with the lowest LOR metric value. In step 201, the routine invokes a subroutine to generate a layout for the program image. One algorithm to generate a layout is described in detail in copending patent application entitled "Method and System for Improving the Layout of a Program Image Using Clustering." Because that algorithm has random selection aspects, each time the algorithm is invoked a different layout is typically generated. In particular, when the algorithm determines that various orderings of basic blocks will have the same effect on improving the locality of references, the algorithm randomly selects one of the orderings. Because a typical program image may have thousands of basic blocks, the algorithm makes many random selections. Thus, each invocation of the subroutine that implements the algorithm is likely to generate a different layout. One skilled in the art would appreciate that many other algorithms may be used to generate the various layouts. This routine can be used to select the layout with the best locality of references regardless of how the layouts are generated. In step 202, the routine invokes a subroutine to calculate the LOR metric value for the generated layout. In step 203, if the predefined number of layouts have already been generated, then the routine continues at step 204, else the routine loops at step 201 to generate the next layout. In step 204, the routine selects the generated layout with the lowest LOR reference metric value and returns that selected layout, which is the output of phase 1 and the input to phase 2.

Figure 3:
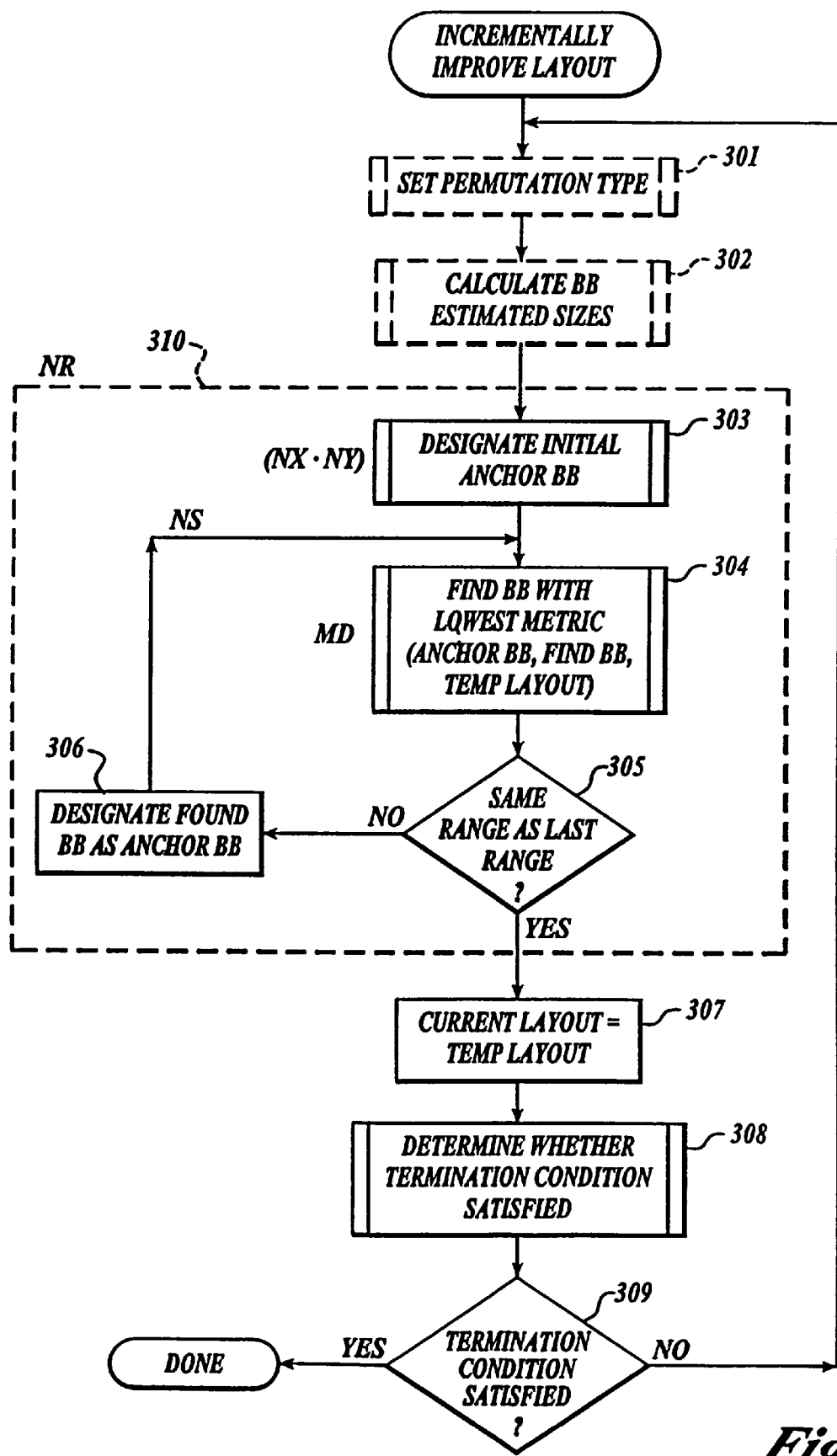
FIG. 3 is a high-level flow diagram of a routine to improve the ordering of the basic blocks of a layout of a program image relative to page boundaries.

FIG. 3 is a high-level flow diagram of a routine to improve the ordering of the basic blocks of a layout of a program image relative to page boundaries. This routine is an implementation of the phase 2 component. One embodiment of this routine is described in detail in copending patent application entitled "Method and System for Incrementally Improving a Program Layout." This routine loops, using what is referred to as a "slinky" algorithm, finding an anchor basic block and selecting another basic block such that when the basic blocks between the anchor basic block and the selected basic block are rearranged the working set of the program image is improved. The routine then rearranges the basic blocks in the range to improve the working set. The routine then repeats this process until a termination condition is satisfied. In steps 303-305, the routine performs the "slinky" algorithm to determine which basic blocks to rearrange. One skilled in the art would appreciate that various different algorithms can be used to select different arrangements of the basic blocks. In steps 307-309, the routine determines whether the termination condition is satisfied. If the termination condition is not satisfied, the routine loops to again incrementally improve the working set.

II. Detailed Description

The present invention includes the following four aspects:
A. an LOR metric function that rates the locality of the references of a layout,
B. a layout number selection technique for selecting the number of layouts to generate and evaluate when selecting a layout with an improved locality of reference,
C. various termination conditions, including a rate of improvement (ROI) termination condition, for determining when to terminate the incremental improvements of the layout, and
D. a ROI selection technique for generating an algorithm to calculate the rate of improvement.

A. Locality of Reference (LOR) Metric Function

Phase 1 generates the various layouts preferably using the greedy agglomerative clustering technique as described in copending application "Method and System for Improving the Layout of a Program Image Using Clustering." Phase 1 could employ several different techniques to select a layout as input for Phase 2. The different techniques attempt to predict which layout will result in the best working set when processed by phase 2. The WS improvement system could rate such layouts by employing the WS metric function, which indicates the size of the working set. However, empirical analysis has shown a low correlation between the size of the working set of the layout input to phase 2, and the size of the working set of the layout output by phase 2. The reasons for this low correlation may be due to accidental properties of the input layout that are not preserved through the incremental improvement process. Since any input layout will have some arbitrary degree of page positioning, this effect will be measured by the WS metric function. Thus, an input layout that happens to have a relatively good temporal usage pattern will have a WS metric value that is lower than other layouts that have a better overall locality of references.

Figure 6:
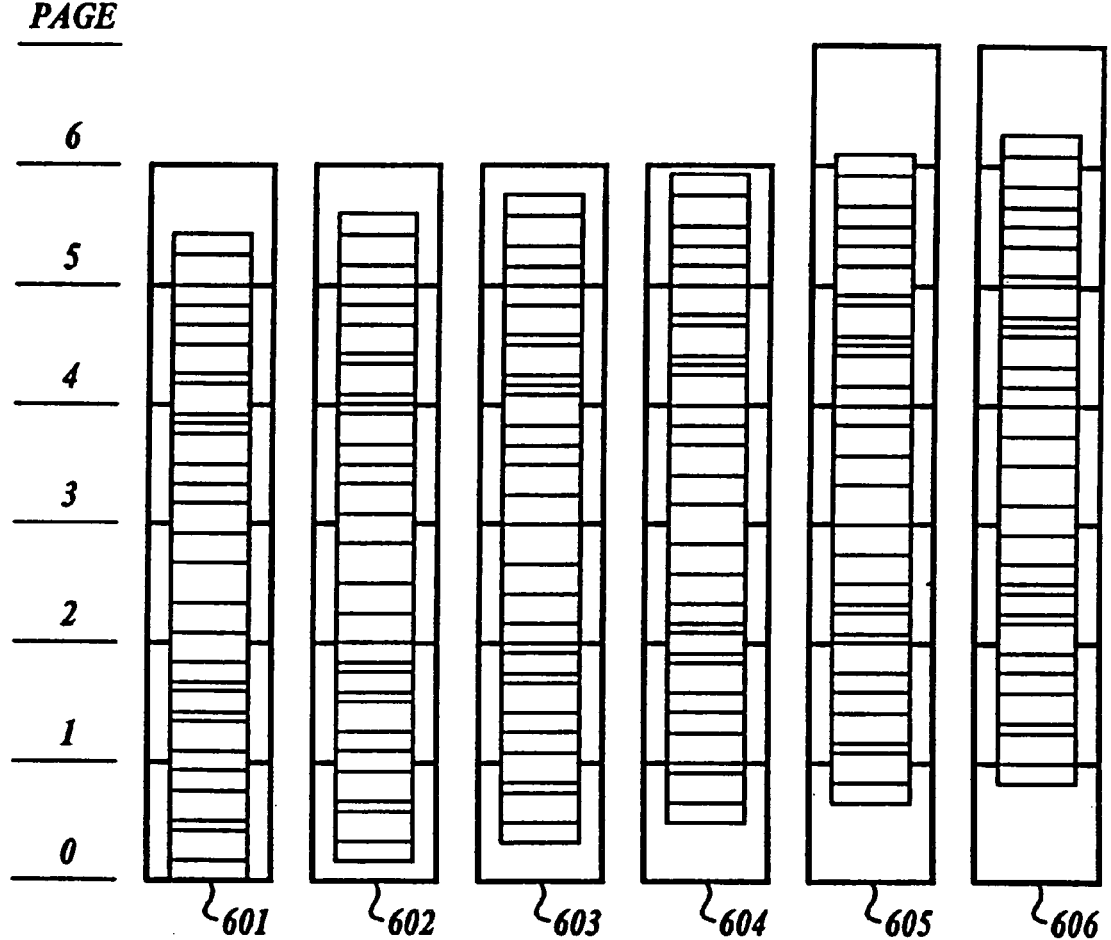
FIG. 6 illustrates the calculation of the LOR metric value.

Rather than using the WS metric function, the WS improvement system evaluates the layouts using a locality of reference (LOR) metric function. The LOR metric value for a layout is calculated by averaging the WS metric values that would result if the layout were positioned to start at various different locations on a page. The goal of this averaging is to produce a metric value that is independent of page boundaries. Thus, in one embodiment, the LOR metric function calculates a WS metric value for each address of a page assuming that the layout is positioned to start at that address. The LOR metric function then averages those WS metric values to generate the LOR metric value for the layout. Since a page typically contains 4,096 addresses, the LOR metric function would calculate 4,096 WS metric values, would sum those WS metric values, and would divide that sum by 4,096 to generate the LOR metric value. FIG. 6 illustrates the calculation of the LOR metric value. The layout 601 is initially assumed to start at address 0 of a page and the WS metric value is calculated. The layout 602 is then assumed to start at address 1 of a page and the WS metric value is calculated. The LOR metric function calculates a WS metric value for each address of a page. However, the calculation of the WS metric value for each address of a page is computationally intensive and has proved to be empirically unnecessary. Experiments have demonstrated that use of a small number of addresses, on the order of 10, can produce nearly as accurate an LOR metric value as does the use of every possible address of a page. To avoid harmonic effects, the LOR metric function uses addresses whose separations are relatively prime to each other. Table 1 lists 10 prime-separated addresses with approximately even distribution throughout a 4,096-byte page.

TABLE 1

| Start Address | Separation |
|---|---|
| 0 | 397 |
| 397 | 431 |
| 828 | 389 |
| 1217 | 443 |
| 1660 | 383 |
| 2043 | 421 |
| 2464 | 401 |
| 2865 | 419 |
| 3284 | 379 |
| 3663 | 433 |

Figure 7:
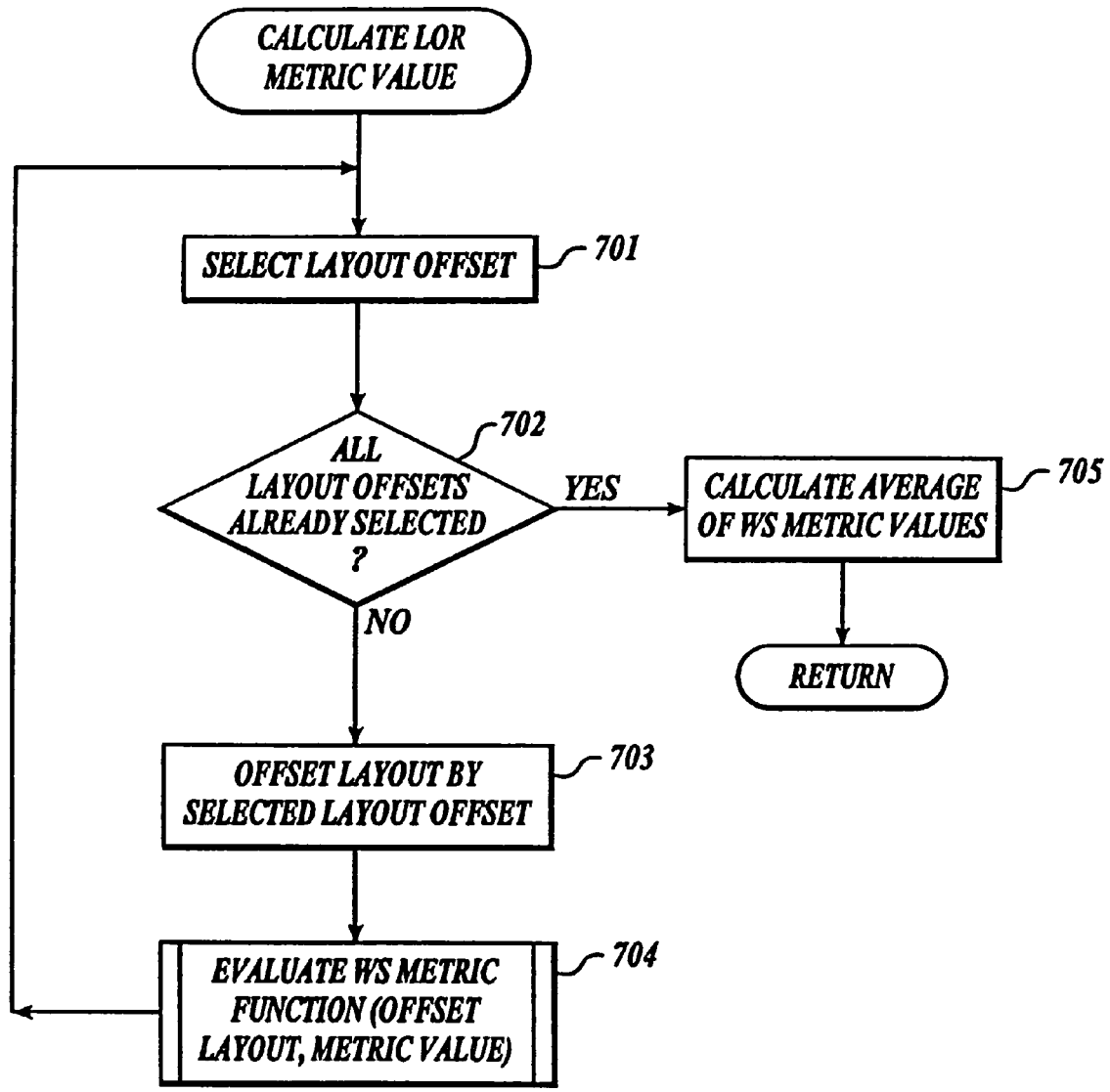
FIG. 7 is a flow diagram of an implementation of a routine to calculate the LOR metric value.

FIG. 7 is a flow diagram of an implementation of a routine to calculate the LOR metric value. The routine loops selecting each of the start addresses as indicated in Table 1 calculating the WS metric value assuming that the layout were to be positioned at the selected start address. The routine then uses the average of the WS metric values as the LOR metric value. In steps 701-704, the routine loops calculating a WS metric value for each of the start addresses. In step 701, the routine selects the next start address for the layout, starting with the first. In step 702, if all the start addresses have already been selected, then the routine continues at step 705, else the routine continues at step 703. In step 703, the routine positions the layout at the selected start address. In step 704, the routine calculates the WS metric value for the layout as positioned at the selected start address. The routine then loops to step 701 to select the next start address. In step 705, the routine calculates the average of the WS metric values and returns that average value as the LOR metric value for the layout.

B. Layout Number Selection Technique

The overall performance of the WS improvement system, both in terms of resulting working set size and of computational speed, is affected by the number of layouts that are generated and evaluated in phase 1. At one extreme, the WS improvement system could simply skip the layout improvement step and incrementally improve the layout of the program image as generated by the linker. Alternatively, the WS improvement system could generate only one layout in phase 1 and incrementally improve that layout. Such an approach would be computationally fast, but may result in a working set size that is less than desirable. At the other extreme, the WS improvement system could generate hundreds of layouts and select the best one to incrementally improve based on the LOR metric values of the layouts. Of course, this approach would be computationally expensive, but would be likely to produce a very desirable working set size. Thus, as the number of layouts generated increases, the chance of generating a layout with a very low LOR metric value increases. However, the expected marginal improvement in the LOR metric value decreases. The layout number selection technique selects the number of layouts that should be generated by determining whether it would be more beneficial to generate and evaluate one more layout or more beneficial to use the computational resources that would have been used to generate and evaluate that additional layout to further incrementally improve the layout with the best LOR metric value without generating and evaluating an additional layout.

To determine where it would be more beneficial (on working set size) to expend the computational resources, the layout number selection technique collects the results of many runs of the WS improvement system and based on a statistical analysis of the results determines the likely benefit on working set size of generating and evaluating a certain number of layouts and the incremental benefit of generating and evaluating one more layout. The number of layouts generated and evaluated could then be set such that the incremental benefit of generating one more layout would not be worth the computational effort. This technique assumes that the results of the many runs are representative of the results of the layouts to be improved. Thus, this technique is most useful in environments in which the program images of the many runs differ only slightly from the program image to be improved. Such a similarity in program images, for example, may exist between daily builds of program image during development of an application program.

The layout number selection technique also assumes that the LOR metric values of multiple layouts of a given program image are normally distributed, that the WS metric values of the output layouts of phase 2 generated from the multiple input layouts are also normally distributed, and that these two distributions are normally correlated. These assumptions appear to be fairly accurate to a first-order approximation. The technique evaluates the results of many runs of the WS improvement system on a wide variety of program images. The technique then calculates the standard deviation ($\sigma$) of the WS metric values of the output layouts of phase 2, and the normal correlation coefficient ($\rho$) between LOR metric value on the input layouts to phase 2 and WS metric value on the output layouts of phase 2.

The probability density function for a standard bivariate normal distribution is $$f(x, y) = \frac{1}{2\pi\sqrt{1-\rho^2}} e^{-\frac{(x^2-2\rho xy+y^2)}{2(1-\rho^2)}}$$

The technique calculates the marginal density of the WS metric value of the output layout that is produced from the input layout of phase 2 with the lowest LOR metric value. Since the problem is symmetric and since any one of the input layouts might have the lowest LOR metric value, the technique assumes that a selected layout has the lowest LOR metric value and then multiplies the resulting density function by the number of layouts (N). The technique then integrates over all values of the N−1 density functions' LOR metric values that are greater than the selected layout's LOR metric value, then over all values of the N−1 density functions' WS metric values, and finally over all values of the selected layout's WS metric value. The result is $$g(y) = N \int_{-\infty}^{\infty} f(x, y) \left( \int_{-\infty}^{\infty} \int_{x}^{\infty} f(t, u) dt du \right)^{N-1} dx$$

The mean value of this marginal density is $$\mu = \int_{-\infty}^{\infty} y g(y) dy$$

Although no closed-form solution exists for this quadruple integral, it may be evaluated numerically to any desired degree of precision. The product of this normalized mean with the standard deviation of the WS metric value on the output layout yields the expected reduction in the final WS metric value from selecting the best of N input layouts, rather than generating only one.

reduction=$\mu\sigma$

Once the expected reduction has been determined, one can evaluate the trade-off between the computational expense of generating and evaluating one more layout versus the expected improvement in the resulting working set from generating and evaluating that additional layout. This trade-off can be evaluated against the trade-off between the computational expense of additional incremental improvement steps versus the expected improvement for performing these additional steps. For a relatively small number of incremental improvement steps, there is likely to be greater benefit to extending the number of incremental improvement steps during phase 2 than in generating and evaluating more layouts during phase 1. For a relatively large number of incremental improvement steps, there is likely to be greater benefit to generating and evaluating more layouts during phase 1 than in increasing the number of incremental improvement steps during phase 2.

Figure 8:
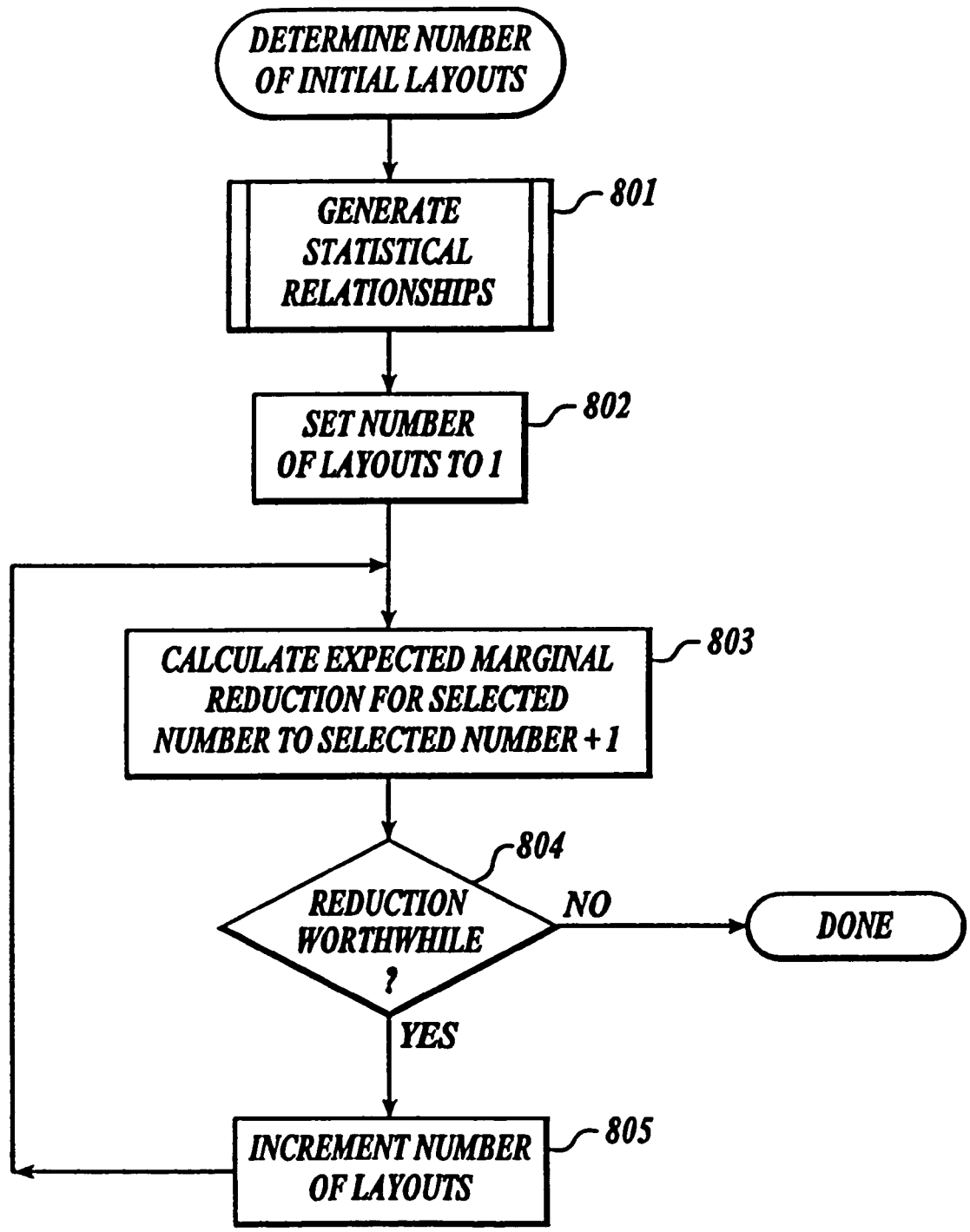
FIG. 8 is a flow diagram of an implementation of a routine to select the number of layouts that should be generated and evaluated.

FIG. 8 is a flow diagram of an implementation of a routine to select the number of layouts that should be generated and evaluated. This routine is an implementation of the layout number selection technique. This routine calculates the expected marginal reduction in the WS metric value from increasing the number of layouts generated during phase 1 from 1 to 2, 2 to 3, 3 to 4, and so on until the expected marginal reduction is not worth the computational expense of generating and evaluating that additional layout. In step 801, the routine invokes a subroutine to generate the statistical relationships for the LOR metric values and the WS metric values collected from various runs of the WS improvement system. In step 802, the routine sets the number of layouts generated during phase 1 to one. In steps 803-805, the routine loops evaluating the expected marginal reduction in the WS metric value of the output layout resulting from generating one more layout during phase 1. In step 803, the routine calculates the expected marginal reduction in the WS metric value of the layout output by phase 2 resulting from increasing the currently selected number of layouts generated during phase 1 by one. In step 804, if the marginal reduction is worth the computational expense, then the routine continues at step 805, else the routine completes. In step 805, the routine increments the number of layouts currently selected as being generated during phase 1 and loops to step 803 to calculate the expected marginal reduction. The number of layouts currently selected when the routine completes is the number selected by the layout number selection technique.

Figure 9:
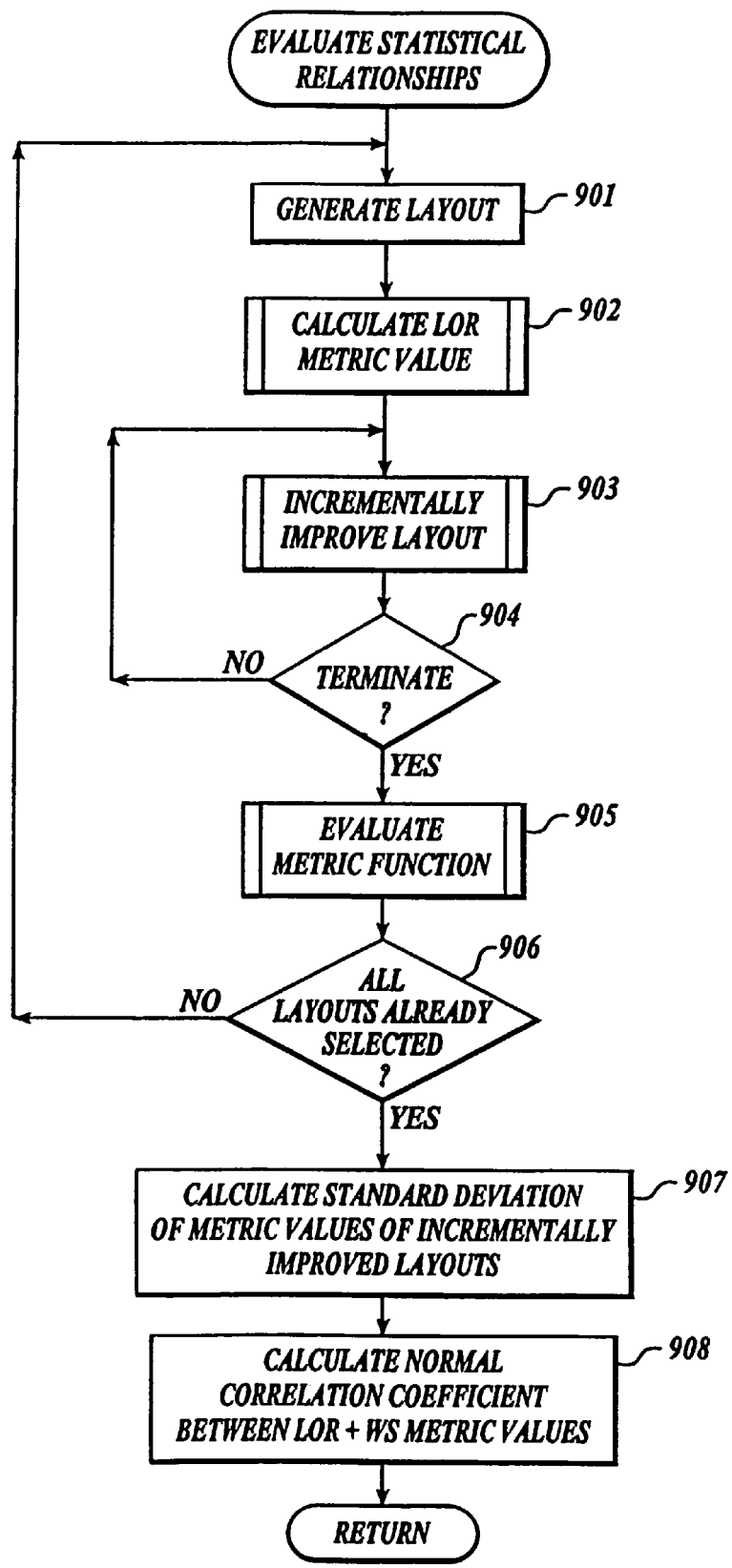
FIG. 9 is a flow diagram of a routine to evaluate the statistical relationships.

FIG. 9 is a flow diagram of a routine to evaluate the statistical relationships. This routine generates a number of layouts, calculates the LOR metric value for each layout, incrementally improves each layout, and calculates the WS metric value for each incrementally improved layout. The routine then calculates the standard deviation (σ) and normal correlation coefficient (ρ) as described above. In steps 901-906, the routine loops generating layouts, calculating the LOR metric value for the layouts, incrementally improving the generated layouts, and calculating the WS metric values for the incrementally improved layouts. In step 901, the routine generates a layout. In step 902, the routine calculates the LOR metric value for the generated layout. In steps 903-904, the routine loops incrementally improving the generated layout until a termination condition is satisfied. The termination condition can be either a fixed number of iterations through the incremental improvement or a specified time period. In step 905, the routine calculates the WS metric value for the incrementally improved layout. In step 906, if enough layouts have already been generated, then the routine continues at step 907, else the routine loops to step 901 to generate another layout. In step 907, the routine calculates a standard deviation (σ) of the WS metric values of the incrementally improved layouts. In step 908, the routine calculates normal correlation coefficient (ρ) between the LOR and WS metric values and returns.

Figure 10A:
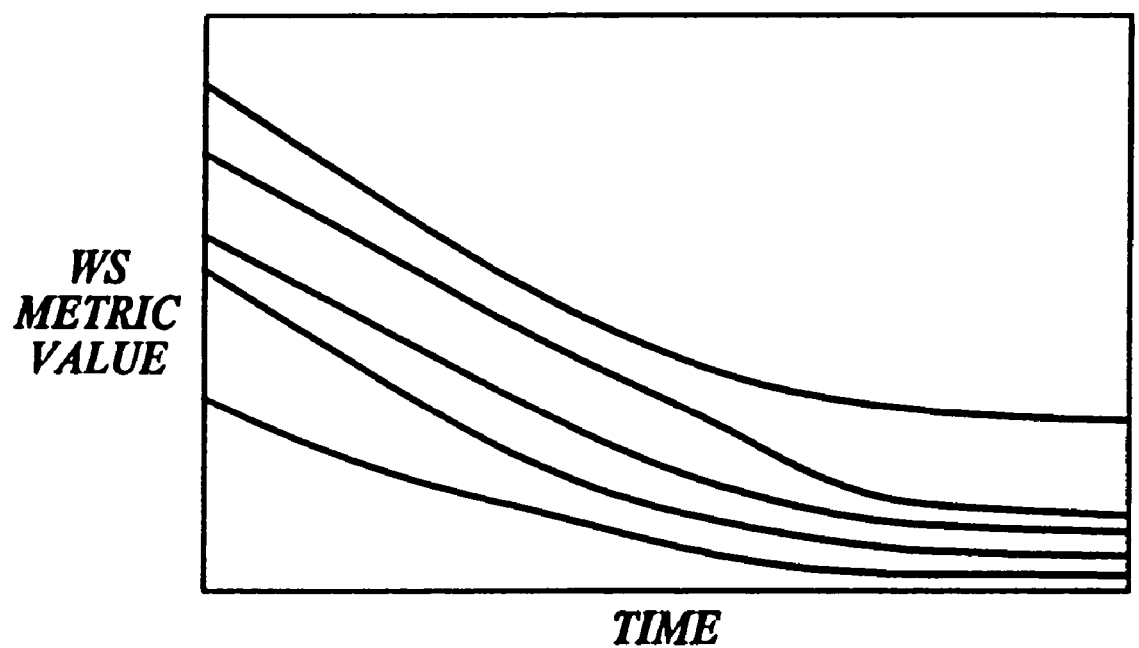
FIG. 10A is a graph of the WS metric values as a function of time for four generated layouts that have been incrementally improved.
Figure 10B:
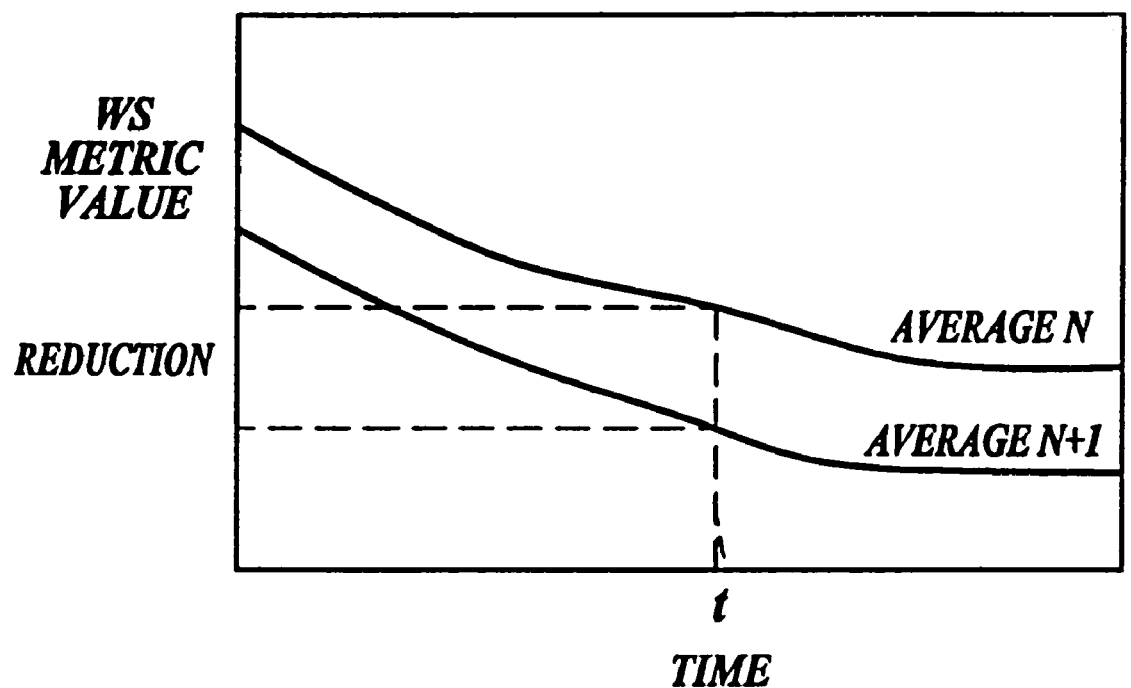
FIG. 10B is a graph of the average WS metric values for various numbers of layouts.
Figure 10C:
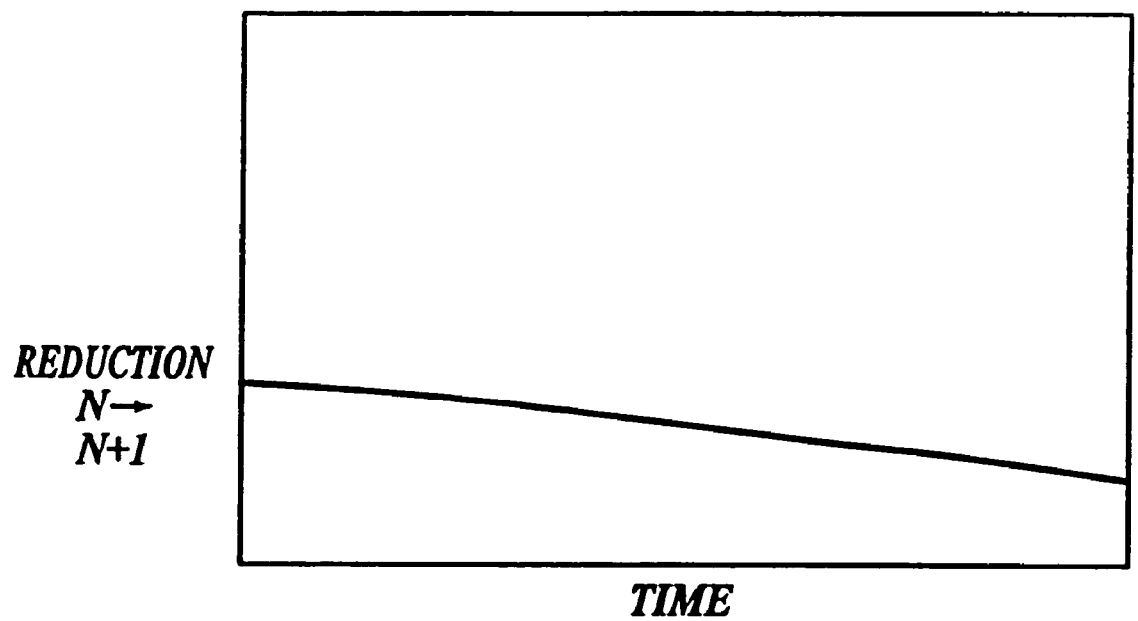
FIG. 10C is a graph of the marginal reduction in the WS metric value as a function of time.

FIGS. 10A-10C are graphs illustrating the layout number selection technique. FIG. 10A is a graph of the WS metric values as a function of iterative improvement time for four generated layouts. The WS metric values are shown in the solid lines and the dashed line represents the average of the WS metric values. FIG. 10B is a graph of the average WS metric values for various numbers of layouts. The dashed lines illustrate the marginal reduction in the WS metric value at time t as a result of generating one more layout during phase 1. FIG. 10C is a graph of the marginal reduction in the WS metric value as a function of iterative improvement time.

C. Termination Conditions for Incremental Improvements

The WS improvement system may use various conditions for terminating the incremental improvement process. The WS improvement system may determine whether a termination condition is satisfied after each incremental step. An incremental step corresponds to the processing of steps 301-308 of FIG. 3. The WS improvement system evaluates whether a termination condition is satisfied in step 309. In particular, the WS improvement system may use one of the following termination conditions:

1. fixed number of incremental steps,
2. fixed amount of elapsed time,
3. WS metric value of the incrementally improved layouts, or
4. rate of improvement (ROI) of the WS metric value of the incrementally improved layouts.

One of these termination conditions or a combination of these terminations may be used depending on the development environment and program image to be improved. Each of these termination conditions is described below. The ROI termination condition, which has general applicability to many development environment and program images, is described in detail.

1. Fixed Number of Incremental Steps

The WS improvement system can terminate the incremental improvement process after a fixed number of incremental steps. The fixed number that is selected for terminating the incremental improvement process can be determined by evaluating the results of many runs of the WS improvement system on a wide variety of data. The mean WS metric value after each number of incremental steps can be compared to the desired trade-off between the working set size and computational expense within any statistical margin that is desired. The use of a fixed number of incremental steps is well-suited to environments in which the program images to be improved are similar. Such similarity may occur during the development of a program in which an executable program is built every day that differs only slightly from day to day.

2. Fixed Amount of Elapsed Time

The WS improvement system can also terminate the incremental improvement process after a specified amount of time has elapsed. After each incremental step, the system can compare the current time to the start time, and if the difference is greater than the fixed amount of time, then the termination condition is satisfied. The use of a fixed amount of time may be particularly advantageous during development of a program. A production build process is likely to be allotted a fixed amount of total time, such as a few hours overnight, and some portion of this may be reserved for layout improvement. Thus, the WS improvement system improves the layout by as much as it can within the fixed amount of time and then terminates.

3. WS Metric Value

The WS improvement system can terminate the incremental improvement process when the WS metric value drops below a preset value. The preset value may be determined either as an absolute value, as a function of the initial WS metric value, as a function of a lower bound on the WS metric value, or as some combination of these. However, for any given program image, the WS metric value may never become less than the preset value. The incremental improvement process generally results in WS metric values along a curve that resembles an exponential decay. For any given starting point and sequence of improvements, there is a minimum value that is approached by the incremental improvement process. Thus, if the preset value is less than this minimum value, the termination condition will never be satisfied. Nevertheless, such a termination condition may be useful if it is used in conjunction with one of the other termination conditions or if the preset value is known to be achievable.

4. Rate of Improvement (ROI) of WS Metric Value

The WS improvement system can also terminate the incremental improvement process when the rate of improvement of the WS metric value drops below a certain rate. However, it can be difficult to determine what actually is the rate of improvement. First, although the size of the improvement in the WS metric value (i.e., change in WS metric value) generally decreases as the incremental improvement process proceeds, the size of the improvement does not decrease monotonically. That is, the change in the WS metric value from one incremental step to the next may increase or decrease as the incremental improvement process proceeds. Second, the WS metric value itself does not even decrease monotonically because of the interaction with the linker. That is, when the linker is periodically invoked during the incremental improvement process to determine a size for the basic blocks, the WS metric value of the layout with the newly determined sizes of the basic blocks may be larger than the WS metric value calculated for the previous incremental step. To overcome these difficulties, the WS improvement system determines the rate of improvement by filtering the WS metric values through a filter. The ROI termination condition is satisfied when the filtered rate of improvement falls below a specified rate.

The filtering technique is described in the following. The rate of improvement may be defined as the change in the WS metric value per time interval (i.e., "ΔWS metric value/time"). The rate of improvement per time interval is related to the change in WS metric value per step (i.e., ΔWS metric value/step) by the following equation:

$$\Delta WS \text{ metric value/time} = \Delta WS \text{ metric value/step} \div \text{time/step}$$

Figure 11:
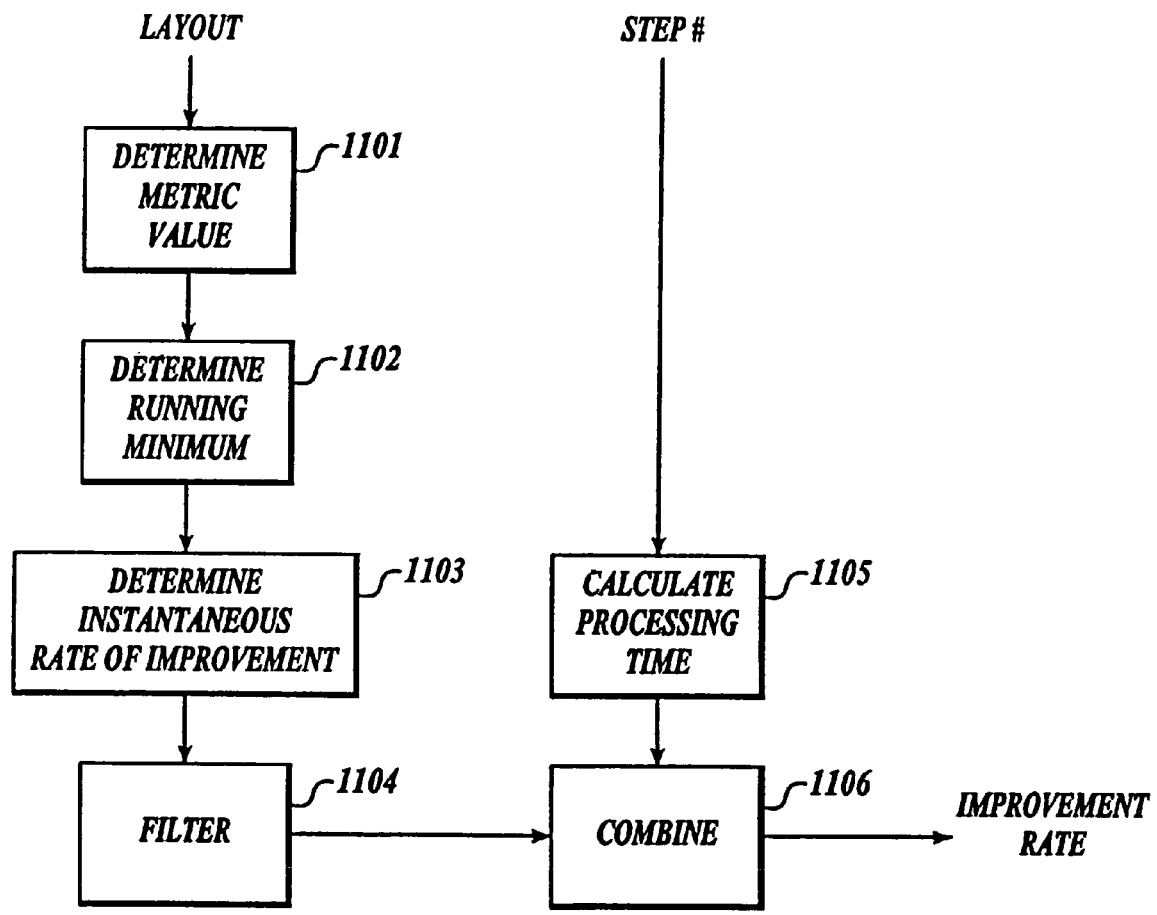
FIG. 11 is a block diagram illustrating the steps for separately calculating the rate of improvement per step and the time per step.

The WS improvement system separates the rate of improvement into two components: the improvement in WS metric value per step and the time per step. The WS improvement system calculates a rate of improvement per step and then divides that calculated rate of improvement by a calculated time per step to generate the rate of improvement. By separating the rate of improvement into these two components, the WS improvement system can apply separate smoothing or approximation techniques to each component as appropriate. In the embodiment described below, the WS improvement system calculates the rate of improvement per step using a filter and calculates the time per step using a predefined approximation function. The WS improvement system then combines these values to calculate the rate of improvement per time interval. FIG. 11 is a block diagram illustrating the steps for separately calculating the rate of improvement per step and the time per step. In steps 1101-1104 the WS improvement system calculates of the rate of improvement per step. The WS improvement system inputs a layout and calculates the WS metric value for the layout. The WS improvement system then calculates the running minimum of the WS metric value. The running minimum represents a value that decreases monotonically. The WS improvement system then calculates the instantaneous rate of improvement based on the current running minimum. The WS improvement system then filters the instantaneous rate of improvement. In step 1105, the WS improvement system inputs the number of the incremental step that produced the layout and calculates the time for that step. Finally, in step 1106, the WS improvement system combines the filtered rate of improvement per step and the calculated time per step to generate the rate of improvement.

Figure 12A:
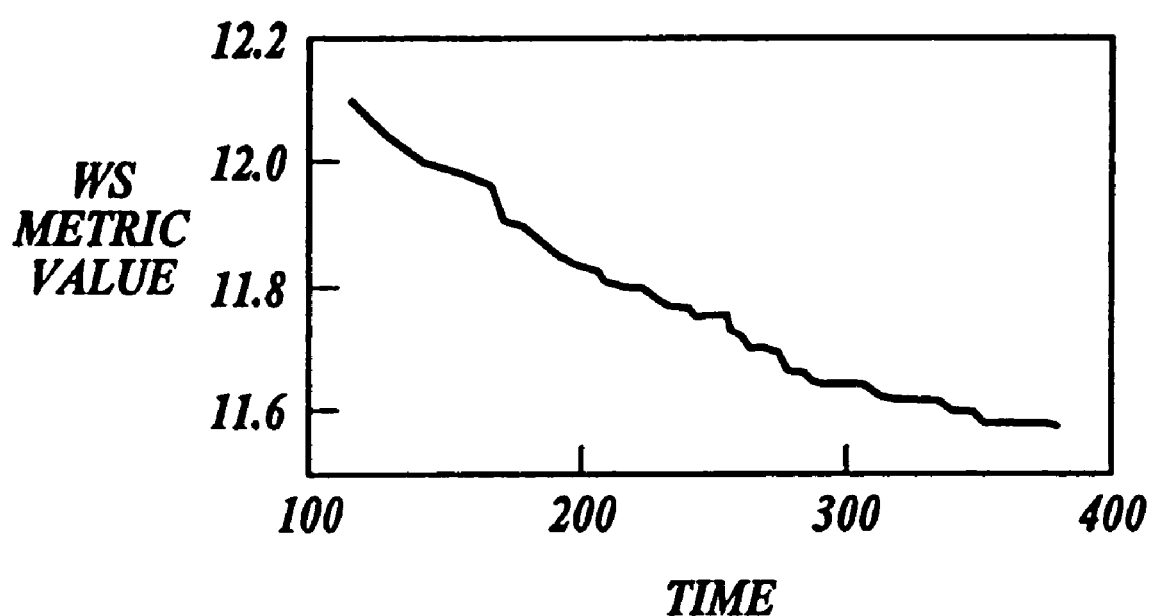
FIG. 12A is a graph of the WS metric value versus time for the incremental improvement process of a sample layout.
Figure 12B:
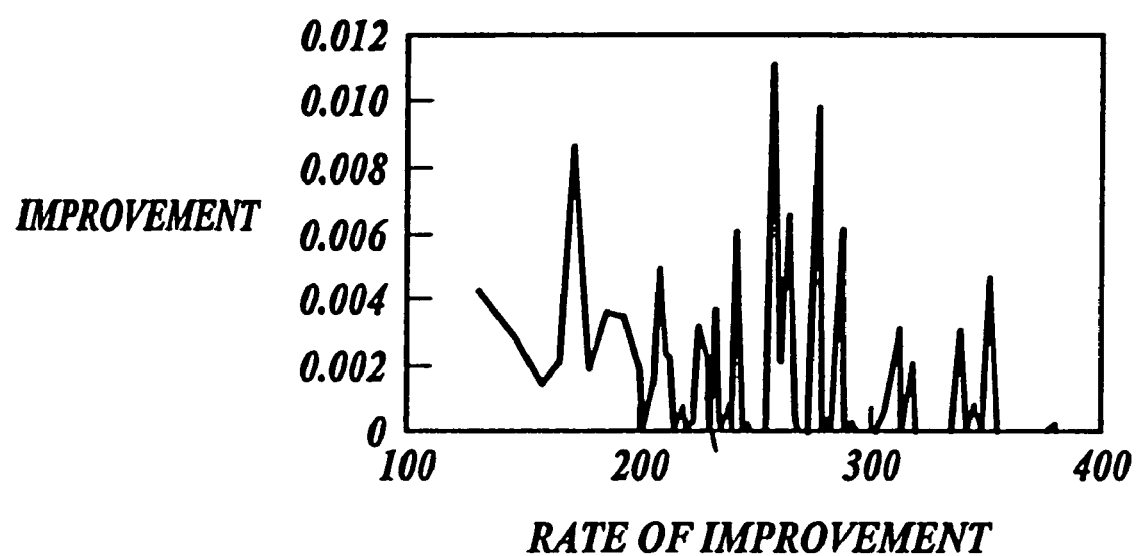
FIG. 12B is a graph of the improvement in the WS metric value for each time interval during the incremental improvement process.
Figure 12C:
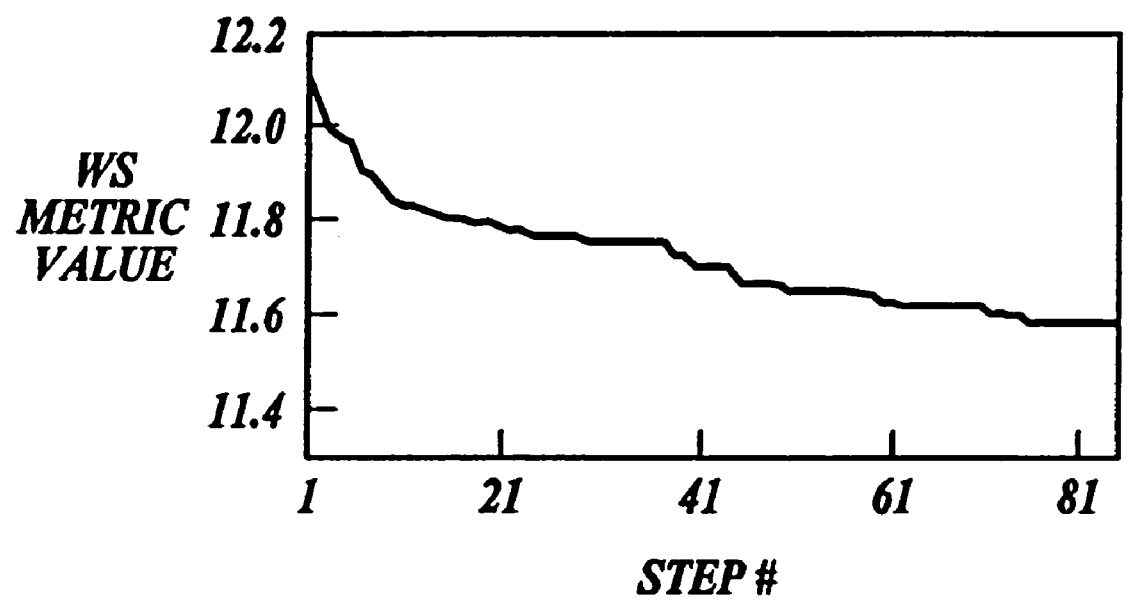
FIG. 12C is a graph of the WS metric value versus step number.
Figure 12D:
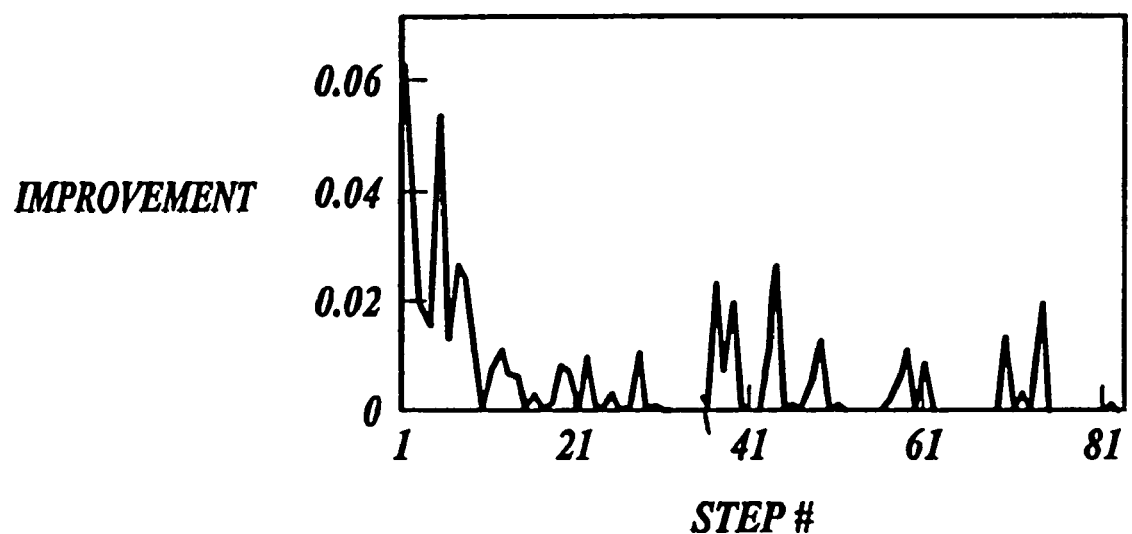
FIG. 12D is a graph of the improvement in the WS metric value for each step.
Figure 12E:
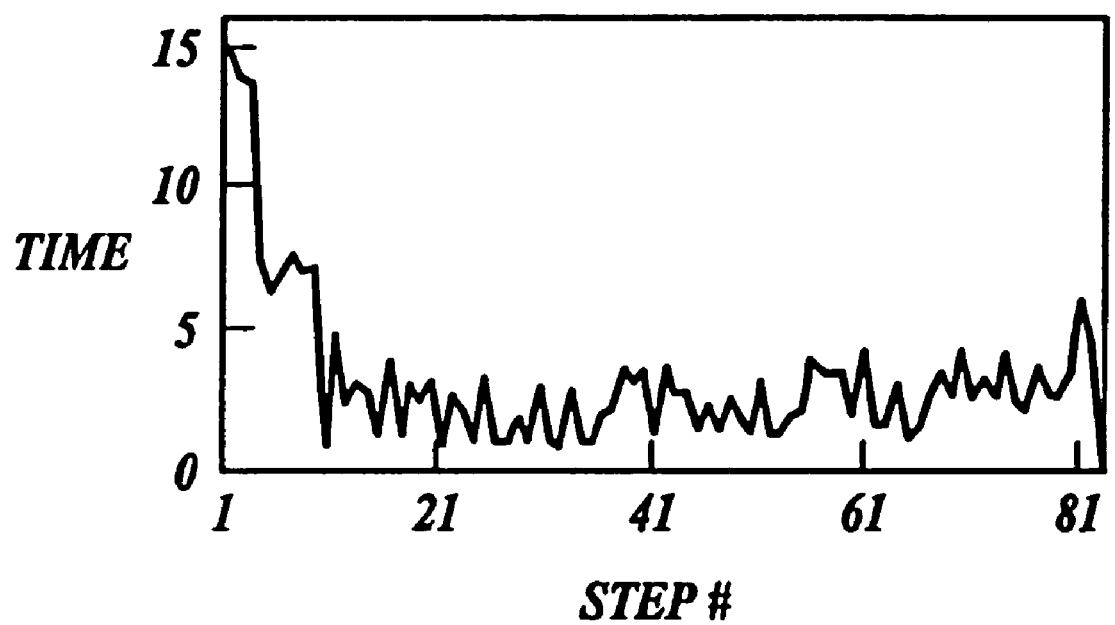
FIG. 12E is a graph of the processing time per step.

A review of the graphs of the various measurements relating to the rate of improvement helps to illustrate the need for filtering. FIG. 12A is a graph of the WS metric value versus time for the incremental improvement process of a sample layout. For example, at time 200 the corresponding WS metric value is approximately 11.8. As the incremental improvement process proceeds, the WS metric value of the incrementally improved layout decreases. However, the improvement from one time interval to the next does not decrease monotonically. For example, a small improvement occurs during time interval 340-345 and a large improvement occurs during the time interval 345-350. FIG. 12B is a graph of the improvement in the WS metric value for each time interval during the incremental improvement process. This graph is generated by taking the difference between WS metric values in successive time intervals. As can be seen by this graph, the improvement per time interval is highly erratic and not monotonic. FIG. 12C is a graph of the WS metric value versus step number. The rate of improvement generally decreases in each step, but does not decrease monotonically. FIG. 12D is a graph of the improvement in the WS metric value for each step. This graph is generated by taking the difference between the WS metric values between successive steps. Although the graph is somewhat erratic, the general trend is a lower rate of improvement as the number of steps increase. FIG. 12E is a graph of the processing time per step. The processing time is fairly high for the first four steps and then drops the next six steps and then drops further and continues at an erratic level but generally tends to increase towards steps 70 and 80.

a) Calculating the Processing Time Per Incremental Step

Figure 4:
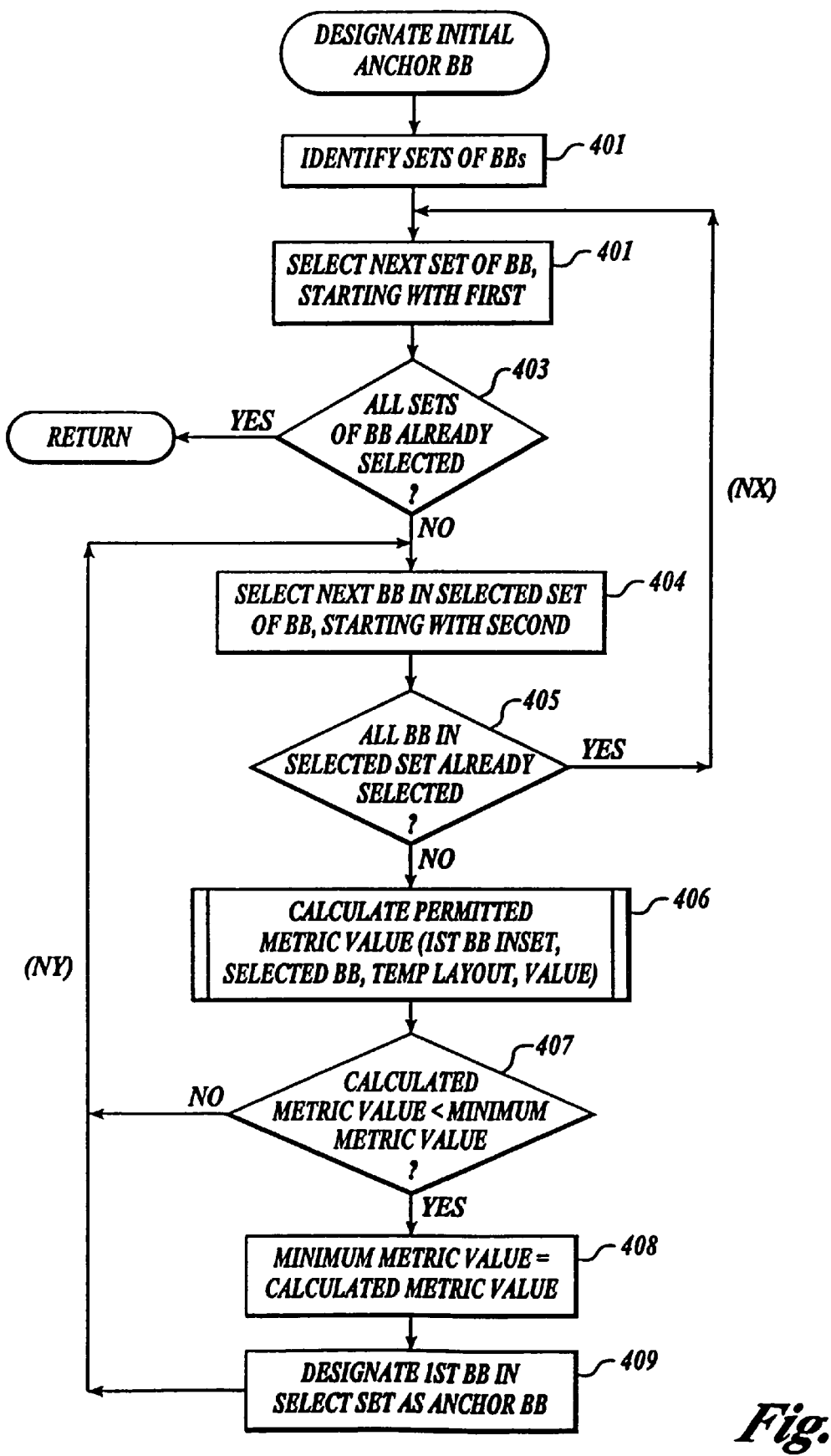
FIG. 4 is a flow diagram of an implementation of a routine to select an initial anchor basic block for the slinky algorithm.
Figure 5:
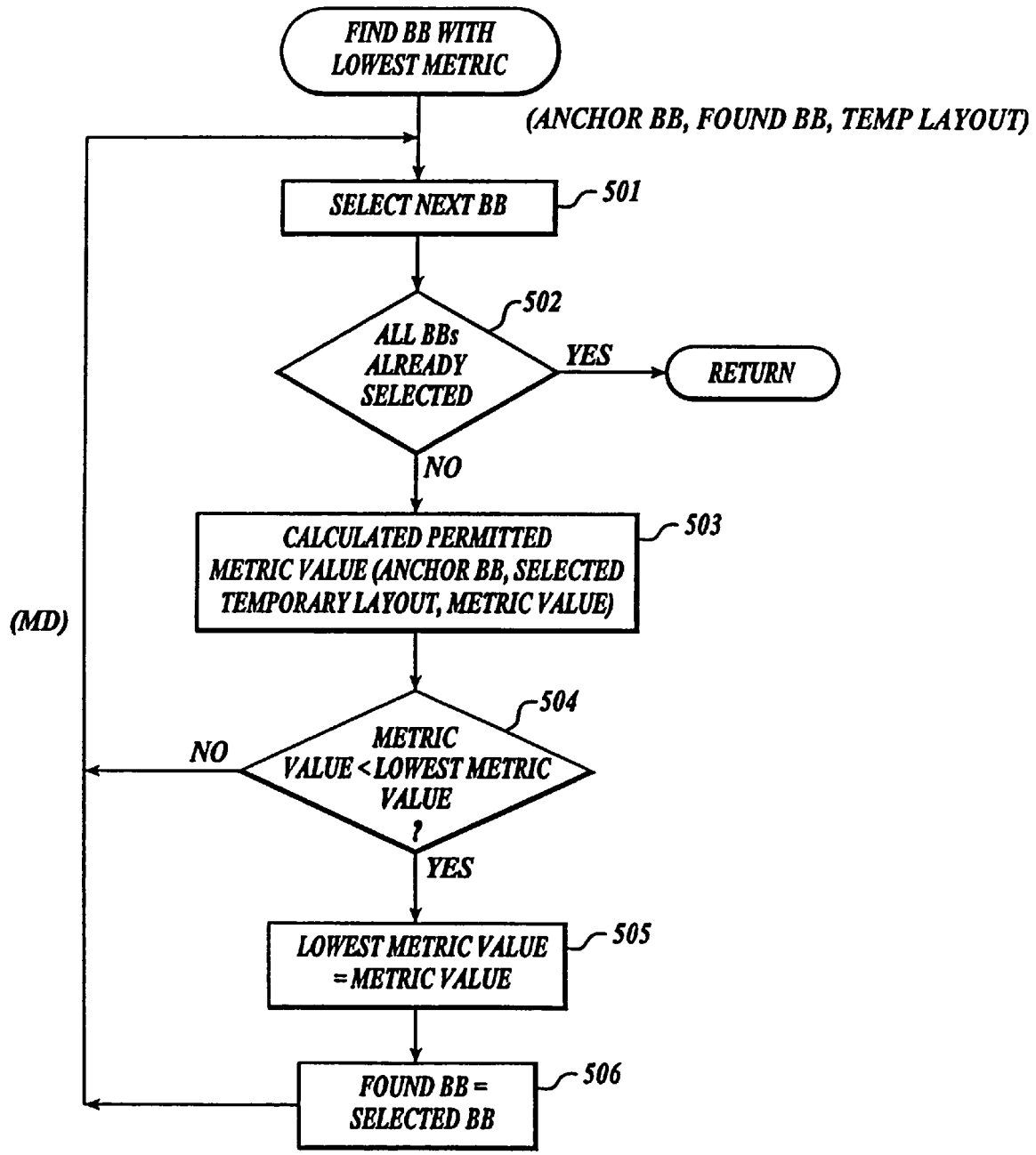
FIG. 5 is a flow diagram of an implementation to find the basic block with the lowest metric value.

The processing time per incremental step varies substantially over the course of the incremental improvement process as shown in FIG. 12E. The WS improvement system in one embodiment, rather than filtering the actual time per step to effect smoothing, estimates the expected time per step as a function of several control parameters that tend to describe the amount of processing during each step. The control parameters can be selected according to the particular incremental improvement algorithm used. In the following, the control parameters for the incremental improvement algorithm that uses the slinky algorithm of FIGS. 3-5 are described. FIG. 3 illustrates the overall incremental improvement process. FIG. 4 is a flow diagram of an implementation of a routine to select an initial anchor basic block for the slinky algorithm. FIG. 5 is a flow diagram of an implementation to find the basic block with the lowest metric value. The basic block with the lowest metric value is that basic block such that when the basic blocks between the anchor basic block and that basic block are rearranged, the resulting metric value of the layout is the lowest. The control parameters for this algorithm are the:

number of times the slinky algorithm (NR) is repeated for each incremental step. This number corresponds to the number of times the sequence of steps 303-306 are performed for each incremental step. This number can vary from each incremental step to the next. In the routine illustrated in FIG. 3, the slinky algorithm is repeated only once for each incremental step. If the slinky algorithm were to be repeated multiple times, then a step before step 307 would determine whether the slinky algorithm had been repeated for the designated number of times for that incremental step. If not, the routine would loop to step 303, else the routine would continue at step 307.

number of sets of basic blocks (NX) identified when searching for an initial anchor basic block. This number corresponds to the number of sets of basic blocks identified in step 401 and to the number of times that step 405 loops to step 402 in FIG. 4.

number of basic blocks (NY) in each identified set of basic blocks. This number corresponds to the number in each set identified in step 401 and to the number of times that steps 407 and 409 loop to step 404 in FIG. 4 for each set.

number of slinky sub-steps (NS) per incremental step. This number corresponds to the number of ranges of basic blocks evaluated during a search of the slinky algorithm and corresponds to the number of times that step 305 in FIG. 3 loops through step 306 to step 304.

maximum search distance (MD) of a slinky sub-step. This distance corresponds to the number of basic blocks evaluated when identifying a range of basic blocks and corresponds to the number of times that step 502 passes control to step 503 in FIG. 5.

number of basic blocks per page in the program image (BP).

various constant terms that can be measured from runs of the incremental improvement system (Cx).

Several of the control parameters contain random components. For example, the number of basic blocks identified (NX) and the number of slinky sub-steps (NS) have a random component. Thus, their expected (mean) values are used.

The amount of processing time required by an incremental step is approximately equal to the number of alternate layouts evaluated multiplied by the time required to perform one evaluation. The alternate layouts are generated and evaluated by the designate initial anchor basic block routine of FIG. 4. The number of evaluations is $$NX \cdot NY$$

The slinky algorithm of FIG. 3 requires the following number of evaluations per step:

$$NS \cdot MD$$

Since the slinky algorithm can be repeated multiple times for a single incremental step, the total number of evaluations is equal to:

$$NR \cdot (NX \cdot NY + NS \cdot MD)$$

The evaluation of each alternate layout requires some constant amount of time (C1), plus an additional amount (C2) that is proportional to the number of pages evaluated, plus some amount (C3) for each block whose usage vector must be logically-ORed to compute the page usage vectors. The number of pages evaluated is determined by the maximum search distance (expressed in basic blocks) and the number of blocks per page. Thus, a single layout evaluation requires the following amount of time:

$$C1 + C2 \cdot (MD/BP) + C3 \cdot MD$$

Thus, the following formula expresses the amount of time required for each step:

$$NR \cdot (NX \cdot NY + NS \cdot MD) \cdot (C1 + C2 \cdot (MD/BP) + C3 \cdot MD)$$

Using this formula, the expected time per step as the incremental improvement process proceeds can be estimated. Since only mean values of the control parameters with random components are used in the formula, short-term variations in the time per step due to randomness are effectively eliminated.

The effect of various values of these control parameters on the actual time per step can be seen in FIG. 12E. The incremental improvement process repeated the slinky algorithm two times (i.e., NR=2) during each of the first four incremental steps and only once per incremental step thereafter. Thus, the time per step dropped from around 15 to around 6 from step 4 to step 5. The incremental improvement process identified a certain number (NX) of sets of basic blocks when identifying an initial anchor basic block for each slinky algorithm search during the first 10 steps and used a lower number for the remainder of the incremental improvement process. The effect of using this lower number is seen by the drop in time per step from around 6 in step 10 to around 2 from step 11 onward. Also, the maximum search distance (MD) gradually decreases and the number of basic blocks (NY) per identified set of basic blocks gradually increases throughout the incremental improvement process. This decrease and increase result in an overall slow decrease in the time per step for steps 11-31 followed by an overall slow increase in the time per step.

b) Filtering the ΔWS Metric Value/Step (1) Background on Filters

Filtering techniques for a stream of input values generally calculate a weighted average of several sequential input values. The goal of the filtering is to smooth out any large variations in the input values so that overall trends of the input values can be more easily identified from the filtered values. A filtering technique is generally described in terms of an equation that specifies the weighted average calculation. The following equation is an example of such an equation:

$$y_i = A_0 x_i + A_1 x_{i-1}$$

where $y_i$ represents the $i^{th}$ filtered value, where $x_i$ represents the $i^{th}$ input value, and $A_N$ represents the weights to be applied to the $(i-N)^{th}$ input value. In this example equation, if $A_0 + A_1 = 1$, then the filtered value is the weighted average of the current input value and the previous input value. Because the equation combines two input values, it is referred to as a second order filter. Filters whose filtered values are based solely on a fixed number of previous input values (i.e., the order) are referred to as finite impulse response (FIR) filters or moving average (MA) filters. Certain filters generate filtered values that are based on a history of all the previous input values and are referred to as infinite impulse response (IIR) filters or autoregressive (AR) filters. The following equation is an example equation of an IIR filter:

$$y_i = A_0 x_i + B_1 y_{i-1}$$

where $y_i$ represents the filtered value, where $x_i$ represents the $i^{th}$ input value, where $A_N$ represents the weight to apply to the $i^{th}$ input value, and where $B_1$ represents the weight to apply to the $y_{i-1}$ filtered value. Because each filtered value of an IIR filter is based on one or more previous filtered values and input values, each filtered value is based on every previous input value. In other words, the first input value has an influence, albeit increasingly small, on every filtered value no matter how many are generated. Indeed, the influence decays exponentially.

(2) The Rate of Improvement Per Step

Figure 13:
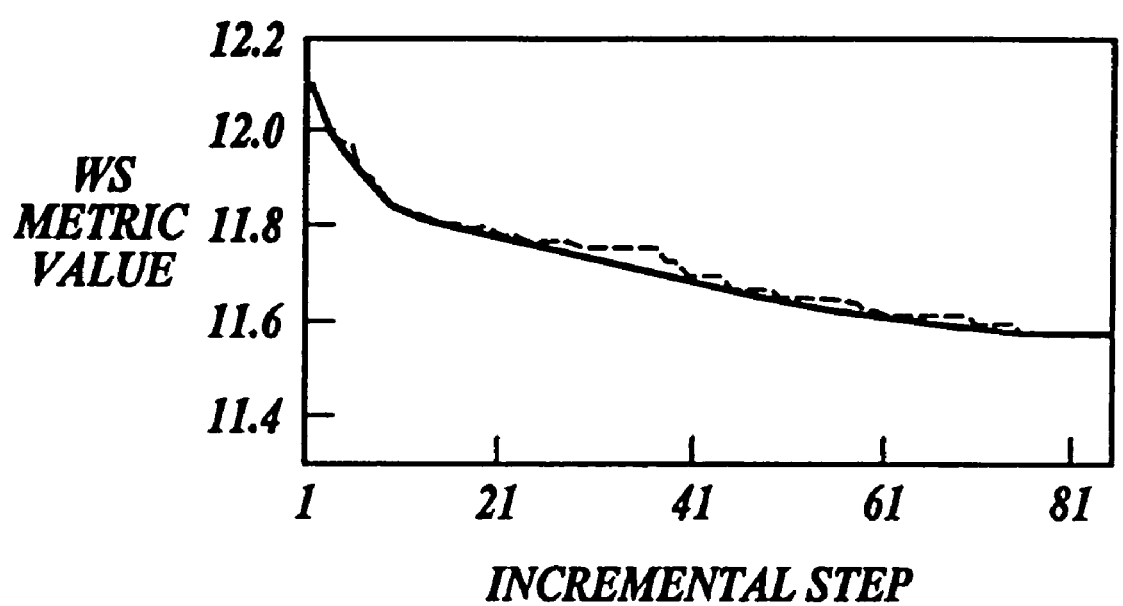
FIG. 13 illustrates the defined rate of improvement for a stream of WS metric values.

The goal of filtering the ΔWS metric values is to produce a stream of filtered ΔWS metric values that reflect the overall rate of improvement in the working set as a result of each incremental step. Given a stream of WS metric values, the rate of improvement at each step is defined as the maximum rate such that if the improvements are continued at that maximum rate, then a WS metric value that is actually present in the stream would result. FIG. 13 illustrates the defined rate of improvement for a stream of WS metric values. The dashed line represents the actual WS metric values and the solid line represents the WS metric values that would result if the defined rate of improvement matched the actual rate of improvement at each incremental step. The solid line is referred to mathematically as the convex hull of the WS metric function, because it is the largest-valued convex curve that lies entirely below the WS metric function. The slope of the convex hull is the defined rate of improvement. (Strictly speaking, the slope is a negative quantity, because the value of the metric function is decreasing over time. So, the use herein of the term "slope" refers to the absolute value of the slope.)

Figure 14:
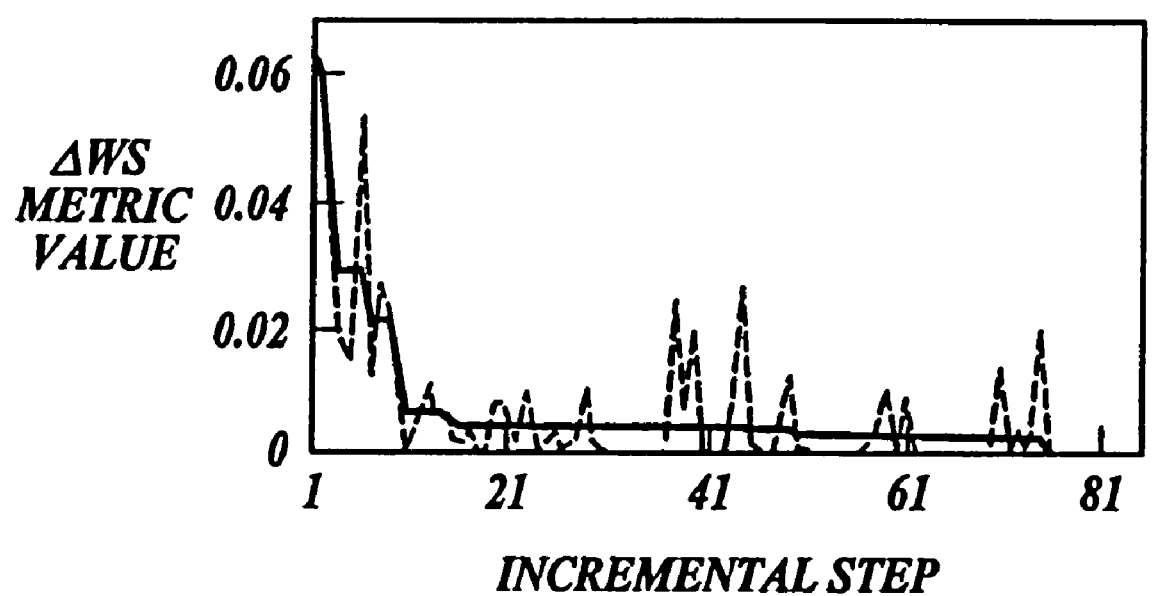
FIG. 14 illustrates the defined rate of improvement and instantaneous rate of improvement.

FIG. 14 illustrates the defined rate of improvement and instantaneous rate of improvement. The instantaneous rate of improvement is shown in the dashed line, and the defined rate of improvement is shown in the solid line. The defined rate of improvement has the desirable property that eventually the average rate of improvement over a number of incremental steps will equal that defined rate. Thus, the defined rate of improvement is used to decide when to terminate the incremental improvement process. The instantaneous rate of improvement has the undesirable property that the improvement at one step can be zero or negative, but be very large at the next step. Thus, if the instantaneous rate of improvement were used to terminate the incremental improvement, then termination might occur just before an incremental step that produces a significant improvement.

Figure 15:
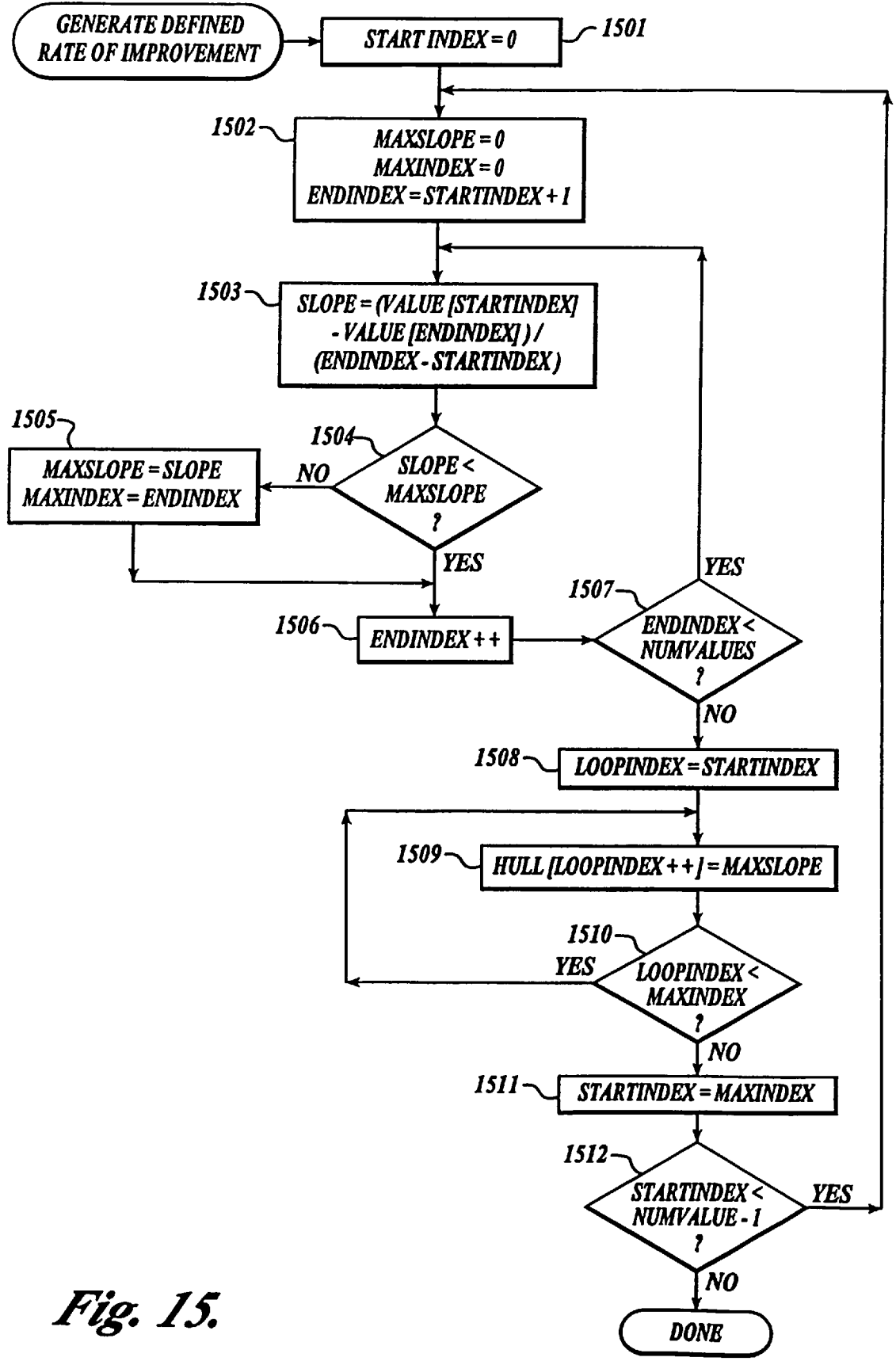
FIG. 15 is a flow diagram of a routine to generate the defined rate of improvement for a stream of known WS metric values.

FIG. 15 is a flow diagram of a routine to generate the defined rate of improvement for a stream of known WS metric values. As described below in detail, this routine is used when analyzing the WS metric values of various runs of the WS improvement system to generate coefficients for the filter. The defined rate of improvement, as described above, is (the absolute value of) the slope of the convex hull. The routine generates the defined rate of improvement by conceptually selecting a starting point on the graph of the WS metric values and searching to the right (i.e., higher incremental step number) for another point on the graph which, when connected to the selected point, would have the maximum slope of all such points to the right. The routine connects those points and repeats the process by selecting the other point and again searching to the right for another point with the maximum slope. The known WS metric values are stored in an array named "value," which is passed to this routine. In step 1501, the routine sets the variable startindex to zero. The variable startindex is used to indicate the index of the point in the array value for which the corresponding point with the maximum slope is to be determined. In step 1502, the routine sets the variables maxslope and maxindex to zero and sets the variable endindex to the value of variable startindex plus one. The variables maxindex and maxslope are used to track the point with the maximum slope when searching. In steps 1503-1507, the routine loops searching towards the end of the graph (i.e., to the right) for the point which results in the maximum slope from the point indexed by the variable startindex. In step 1503, the routine sets the variable slope equal to the array value indexed by the variable startindex minus the array value indexed by the variable endindex divided by the number of steps between the indexes. In step 1504, if the variable slope is less than the variable maxslope, then a point with a larger slope has already been found, then the routine continues at step 1506 to continue searching, else the routine continues at step 1505. In step 1505, the routine sets the variable maxslope equal to the variable slope and the variable maxindex equal to the variable endindex. In step 1506, the routine increments the variable endindex. In step 1507, if the variable endindex is less than the variable numvalues (i.e., number of metric values), then the routine loops to step 1503 to check the slope for the next point in the graph, else the routine continues at step 1508. In steps 1508-1510, the routine sets the value of the defined rate of improvement for the points between the variable startindex and the maxindex to the value of the variable maxslope. In step 1508, the routine sets the variable loopindex equal to the variable startindex. In step 1509, the routine sets the array hull indexed by the variable loopindex equal to maxslope and increments the variable loopindex. In step 1510, if the variable loopindex is less than the variable maxindex, then the routine loops to step 1509, else the routine continues at step 1511. In step 1511, the routine sets the variable startindex equal to the variable maxindex to continue searching from the point indexed by the variable maxindex. In step 1512, if the variable startindex is less than the variable numvalues minus one, then the routine loops to step 1502 to continue determining the defined rate of return for the points past the variable maxindex, else the routine is done.

During the incremental improvement process, the defined rate of improvement for the current incremental step can, of course, not be determined because the WS metric values for subsequent steps are not yet known. Thus, the goal of the rate of improvement (ROI) termination condition is to estimate accurately the defined rate of improvement of the current incremental step so that additional incremental steps can be avoided if the defined rate of improvement indicates that they would not be worth the computational expense.

The techniques described below generate coefficients for the filter for the instantaneous rate of improvement of the WS metric values. As a first step, a running minimum of the WS metric values is maintained. This running minimum effects a filtering of artifacts in the WS metric value resulting from invocations of the linker. In addition, the running minimum monotonically decreases, which is a desirable attribute for subsequent filtering. The coefficient generation techniques analyze data (e.g., WS metric values) for a large number of runs of the WS improvement system when generating the coefficients.

(3) Generating Coefficients Using Frequency-Domain Analysis

Figure 16:
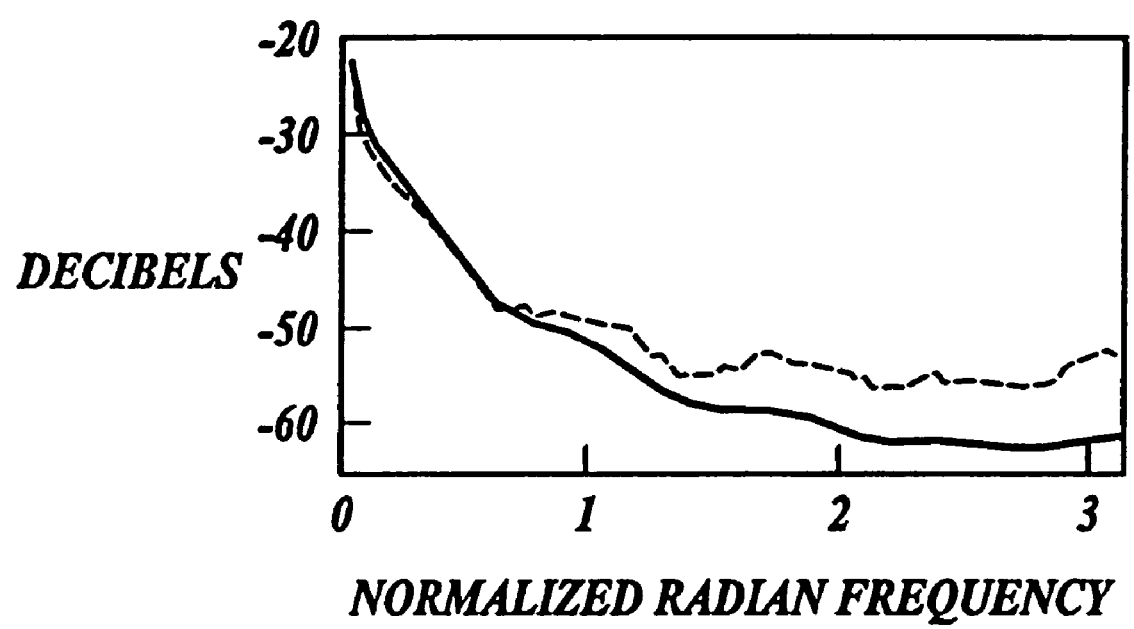
FIG. 16 illustrates the power spectra.
Figure 17:
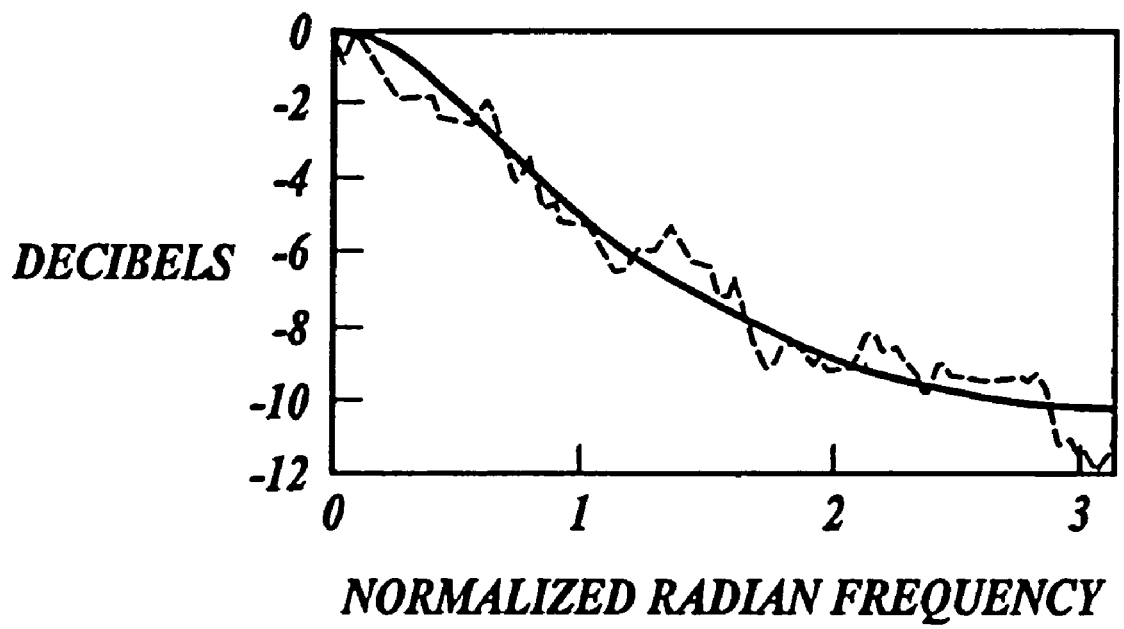
FIG. 17 illustrates the offset differences in the power spectra.

The frequency-domain analysis technique computes a power spectrum for the instantaneous rate of improvement and a power spectrum for the defined rate of improvement for various runs of the WS improvement system. The power spectra are obtained by computing a discrete Fourier transform of the time series data for the rate of improvement. FIG. 16 illustrates the power spectra. The dashed line represents the power spectrum for the instantaneous rate of improvement, and the solid line represents the power spectrum for the defined rate of improvement. The horizontal axis is normalized to radian frequencies, and the vertical axis is in decibels. The technique calculates the difference between the two spectral curves and offsets the difference so that the value is zero at a frequency of zero. The dashed line in FIG. 17 illustrates the offset differences in the power spectra. The technique then fits the frequency response curve of a filter to the offset difference. In FIG. 17, the solid line represents the frequency response of a first-order IIR filter that minimizes the mean squared error with respect to the offset differences. Alternatively, a higher-order IIR filter or a FIR filter could be used. Also, a different type of curve-fitting function other than mean squared error could be used. Since the frequency response varies non-linearly with the filter coefficients, an iterative technique, such as the Levenberg-Marquardt algorithm is used. The Levenberg-Marquardt algorithm is described in Press, W. et al., "Numerical Recipes in C: The Art of Scientific Computing," 2nd ed., Cambridge University Press, 1992, pp. 683-88.

Figure 18:
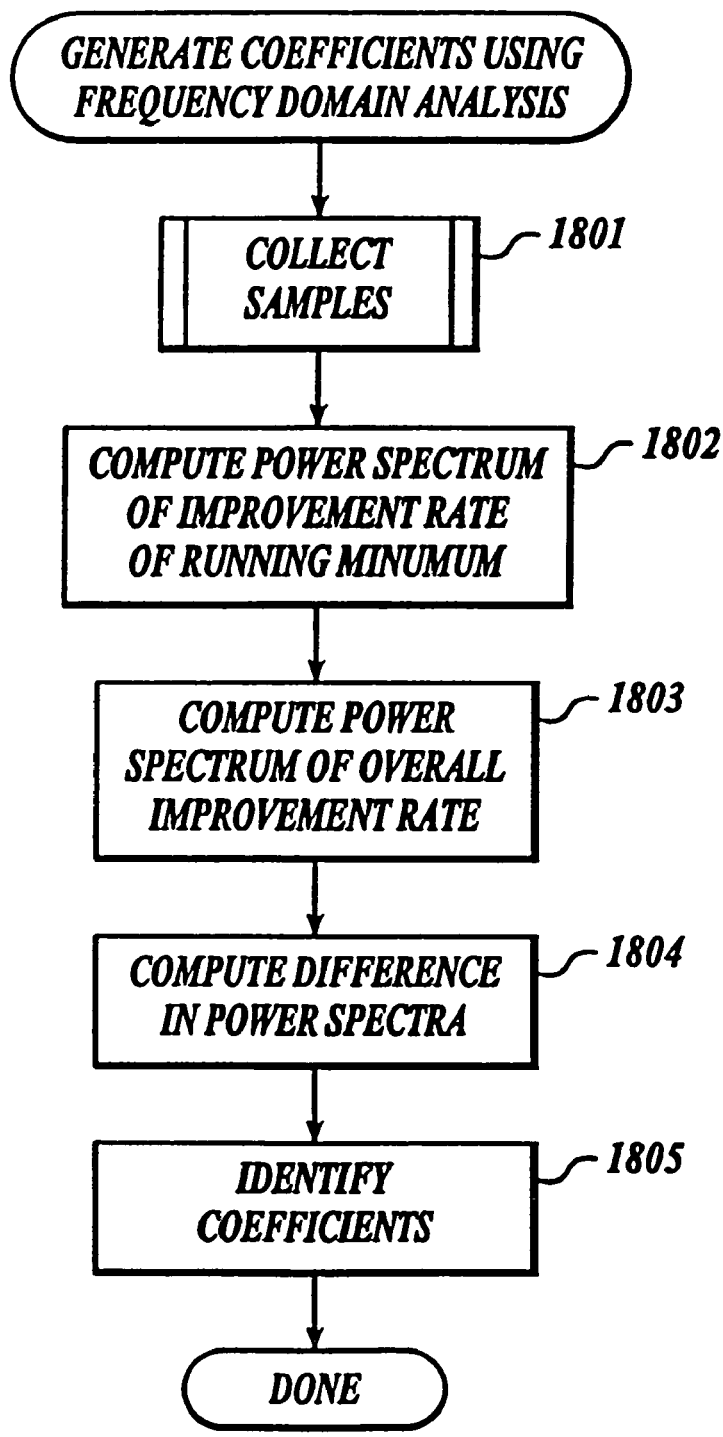
FIG. 18 is a flow diagram of a routine to generate the filter coefficients using the frequency-domain analysis.

FIG. 18 is a flow diagram of a routine to generate the filter coefficients using the frequency-domain analysis. In step 1801, the routine collects data from various runs of the WS improvement system. These runs can use a termination condition based on a fixed-number of incremental steps or a fixed-time period. In this step, the routine also computes the defined rate of improvement according to the steps of FIG. 15. In step 1802, the routine computes the power spectrum of the running minimum of the instantaneous rate of improvement in the collected WS metric values using a discrete Fourier transform. In step 1803, the routine computes the power spectrum of the actual defined rate of improvement. In step 1804, the routine computes the difference offset between the power spectra. In step 1805, the routine uses the Levenberg-Marquardt algorithm to determine the coefficients for the filter.

(4) Generating Coefficients Using Time-Domain Analysis

The time-domain analysis technique generates coefficients for a FIR filter based on the instantaneous rate of improvement of the running minimum of the WS metric values and the actual defined rate of improvement of various runs of the WS improvement system. The technique first generates coefficients for a first-order FIR filter and then a second-order FIR filter. If the improvement between the first-order and second-order FIR filters is significant, then the technique repeats this process for successively higher-order FIR filters until the improvement is no longer significant. The coefficients for the highest-order FIR filter that showed a significant improvement are to be used in the filtering. Alternatively, the WS improvement system can determine whether the improvement in the next higher-order FIR filter would be significant without even generating the coefficients for that next higher-order FIR filter. The WS improvement system can calculate the error between the estimated rate of improvement using the first-order FIR filter and the actual defined rate of improvement. If the correlation between that error and the additional WS metric value that would be added with the next higher-order FIR filter is significant, then the next higher-order FIR filter is generated and the process continues, else the current-order FIR filter is used.

Figure 19:
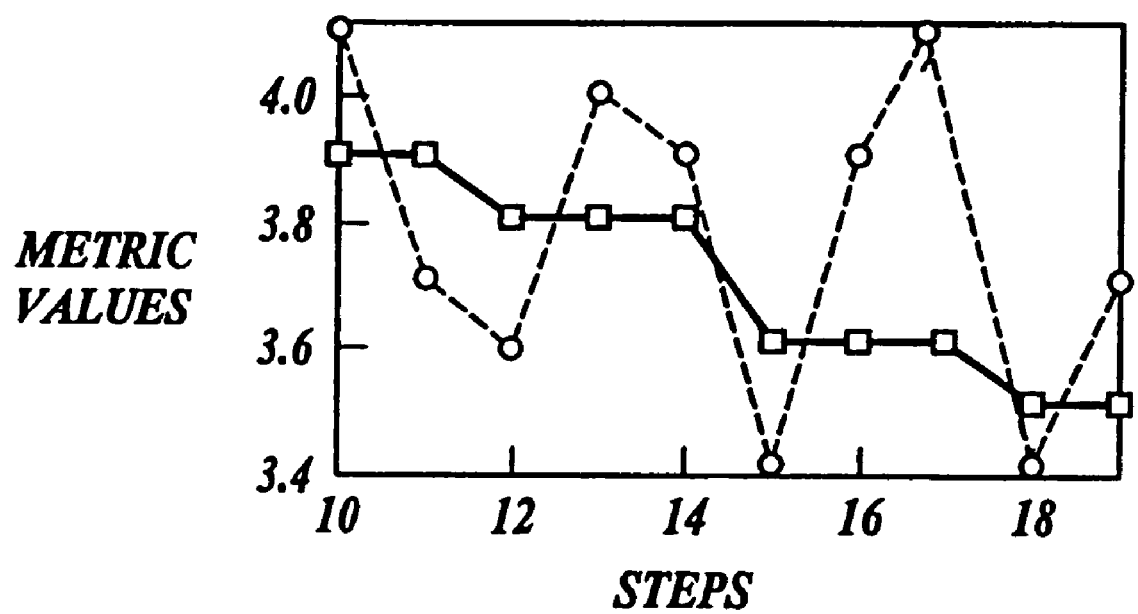
FIG. 19 illustrates the instantaneous rate of improvement and the to actual defined rate of improvement for a sample run.

FIG. 19 illustrates the instantaneous rate of improvement and the actual defined rate of improvement for a sample run. The circles indicate the differences in running minimum of the WS metric values for each incremental step, and the squares indicate the differences in the WS metric values that would produce the actual defined rate of improvement. The circles thus represent input values, and the squares represent target values.

The technique initially derives a first-order, linear expression for a function that relates each input value to the corresponding target value. The function is thus of the form:

$$T_n = A_0 I_n$$

Each target value, $T_n$, is the product of a constant coefficient, $A_0$, and the current input value, $I_n$. For example, the input value $I_{12}$ in FIG. 19 is 3.6, and the target value $T_{12}$ is 3.8, meaning that the ideal value of $A_0$ is 3.8/3.6=1.06. However, the input value $I_{13}$ is 4.0, and the target value $T_{13}$ is 3.8, meaning that the ideal value of $A_0$ is 3.8/4.0=0.95. Since $A_0$ cannot equal both of these values, the technique chooses as a compromise the value for $A_0$ that minimizes the mean squared error over all target values. Since this fit is linear, the value for the coefficient can be determined through standard linear regression techniques, an important consideration since the volume of data is likely to be large. For squared error is minimized by a value of 0.98 for $A_0$, then the values and associated residual errors are indicated in Table 2.

TABLE 2

| n  | $I_n$ | $T_n$ | $A_0 I_n$ | $E_n$(error) |
|----|-----|-----|---------|------------|
| 10 | 4.1 | 3.9 | 4.0 | 0.1 |
| 11 | 3.7 | 3.9 | 3.6 | −0.3 |
| 12 | 3.6 | 3.8 | 3.5 | −0.3 |
| 13 | 4.0 | 3.8 | 3.9 | 0.1 |
| 14 | 3.9 | 3.8 | 3.8 | 0.0 |
| 15 | 3.4 | 3.6 | 3.3 | −0.3 |
| 16 | 3.9 | 3.6 | 3.8 | 0.2 |

TABLE 2-continued

| n  | $I_n$ | $T_n$ | $A_0 I_n$ | $E_n$(error) |
|----|-----|-----|---------|------------|
| 17 | 4.1 | 3.6 | 4.0 | 0.4 |
| 18 | 3.4 | 3.5 | 3.3 | −0.2 |
| 19 | 3.7 | 3.5 | 3.6 | 0.1 |

Such a first-order FIR filter is unlikely to provide a very good estimate of the target values, so the technique determines whether the filtering can be improved by using a higher-order FIR filter. For example, the previous estimate of $T_{13}$ was based only on $I_{13}$. An estimate with a second-order FIR filter is based on both $I_{13}$ and $I_{12}$. Similarly, the previous estimate of $T_{12}$ was based only on $I_{12}$. An estimate with a second-order FIR filter is based on both $I_{12}$ and $I_{11}$. The second-order, linear expression of the form:

$$T_n = A_0 I_n + A_1 I_{n-1}$$

The technique then determines whether there is a significant reduction in the residual errors from adding the additional linear term to the FIR filter. The technique can determine the likely benefit from the additional term without actually performing the derivation of the new expression. The technique does so by examining the statistical correlation between each error term ($E_n$) and the input value that leads each error term by one step ($I_{n-1}$). This analysis can employ any effective correlation metric, such as the normal correlation coefficient or the rank correlation coefficient. If there is a significant statistical correlation, then there is benefit to deriving the more higher-ordered expression. The technique repeats this process for third-order, linear expressions, and then fourth-order, and so on, until there is no statistically significant improvement from increasing the linear order of the expression.

The technique generates a set of coefficients ($A_0, A_1, \ldots, A_N$) have been derived for an $N^{th}$-order linear expression that is equivalent to an $N^{th}$-order FIR filter. As the order increases, so too does the initial latency before which no estimate of the rate of improvement is available. The technique can set a cap on is the maximum value of N in order to limit this latency.

Figure 20:
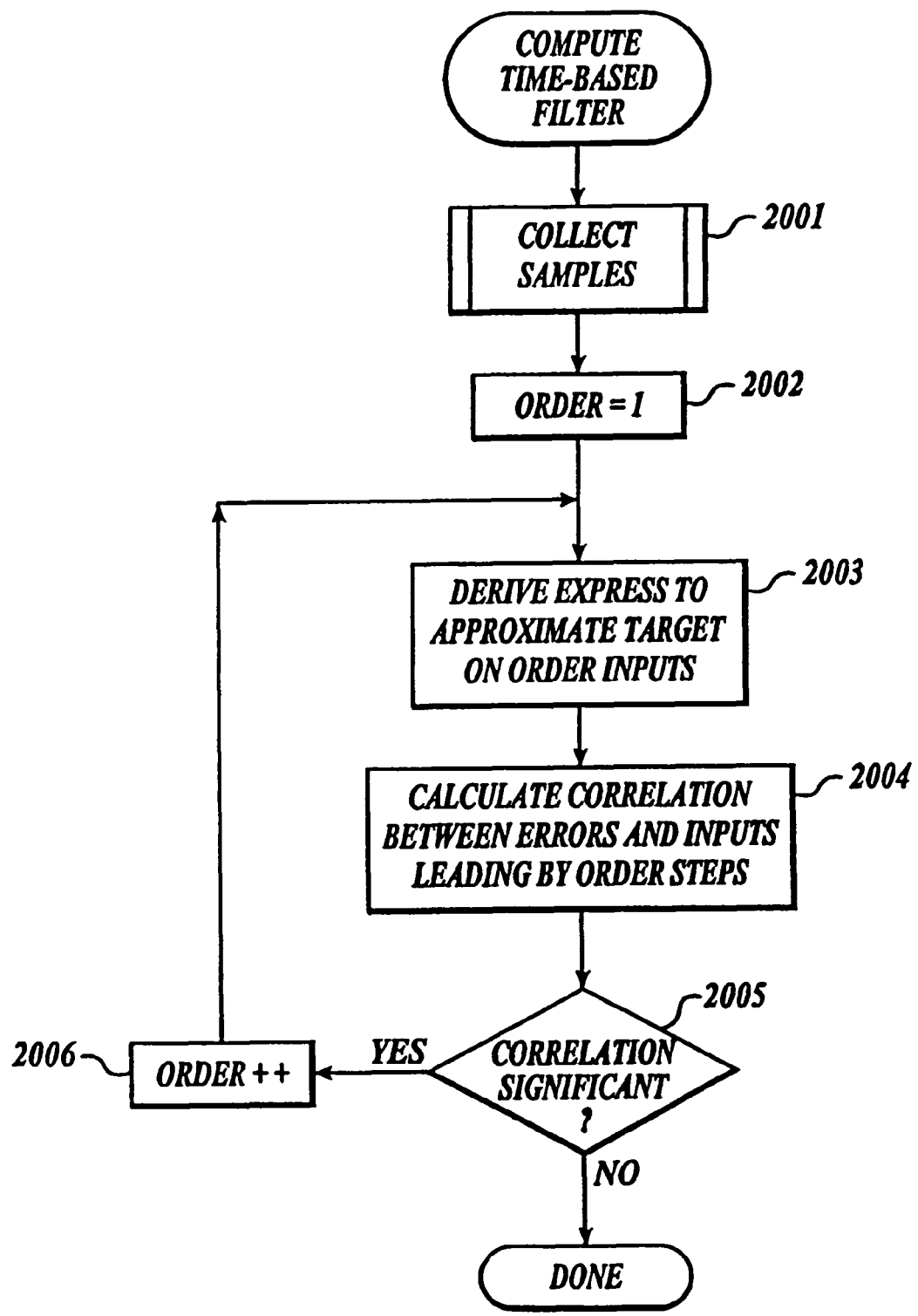
FIG. 20 is a flow diagram of a routine to generate the coefficients of the filter using time-domain analysis.

FIG. 20 is a flow diagram of a routine to generate the coefficients of the filter using time-domain analysis. In step 2001, the routine collects the WS metric values for various runs of the WS improvement system. The routine also calculates the corresponding target WS metric value derived from the actual defined rate of improvement. In step 2002, the routine initializes the order of the FIR filter to one. In steps 2003-2006, the routine loops generating coefficients for successively higher-order FIR filters until the correlation between each error term ($E_n$) in the current-order (N) FIR filter and each $N^{th}$ previous input value ($I_{n-N}$) is not significant. In step 2003, the routine derives the coefficients for the current order and the error terms. In step 2004, the routine calculates the correlation between each error term and each $N^{th}$ previous WS metric value. In step 2005, if the correlation is significant, then the routine increments the order in step 2006 and loops to step 2003 to process the next higher order, else the routine is done.

Figure 21:
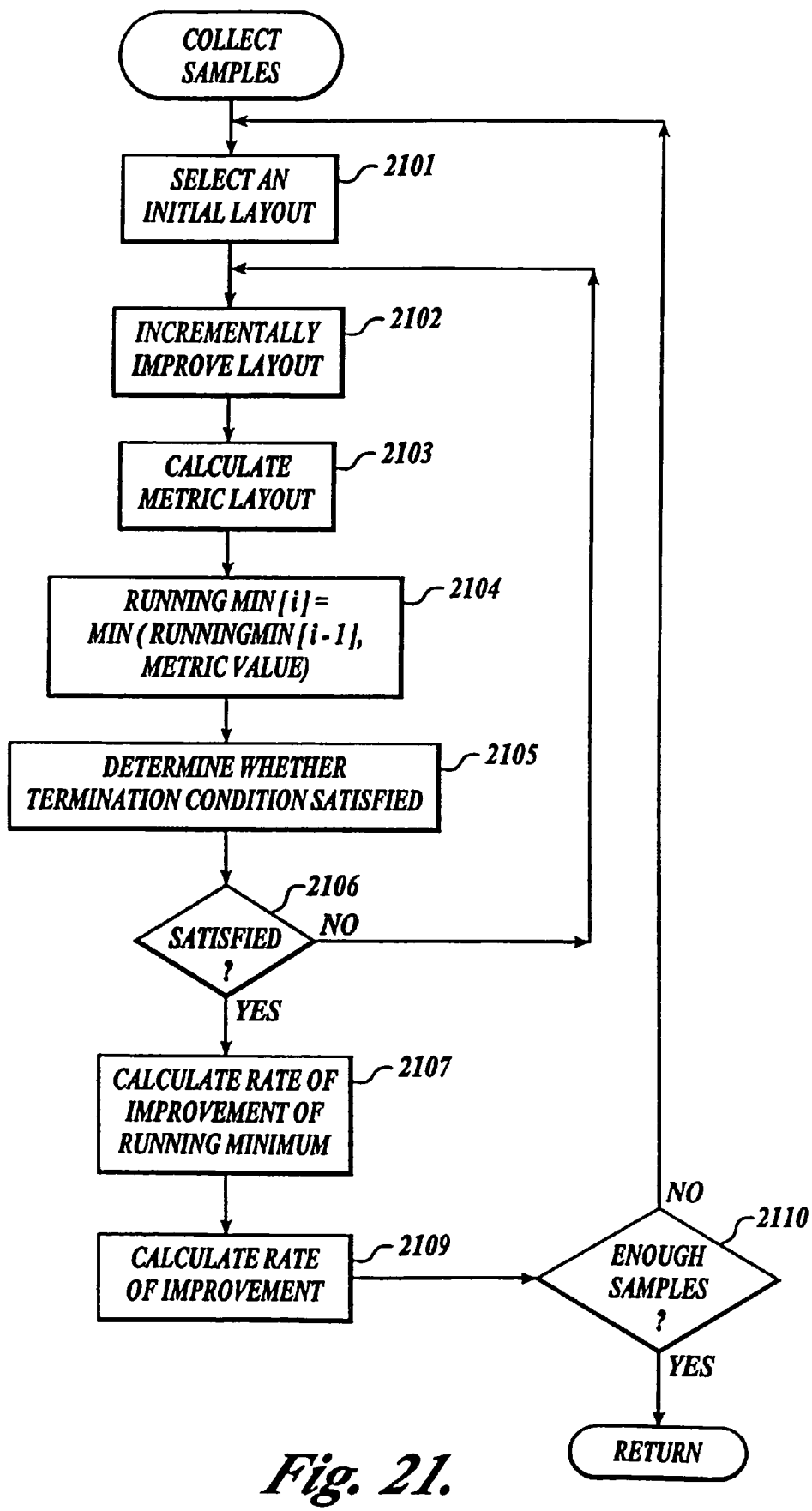
FIG. 21 is a flow diagram of a routine to collect samples for generating coefficients for a filter.

FIG. 21 is a flow diagram of a routine to collect samples for generating coefficients for a filter. In steps 2101-2110, the routine loops selecting an initial layout, incrementally improving the layout, and calculating the instantaneous rate of improvement of the running minimum and the actual defined rate of improvement based on the WS metric value of the incremental steps. In step 2101, the routine selects an initial layout. In steps 2102-2106, the routine incrementally improves the layout until a termination condition (e.g., fixed-number of steps) is satisfied. In step 2102, the routine incrementally improves the layout. In step 2103, the routine calculates the WS metric value for the incrementally-improved layout. In step 2104, the routine calculates the running minimum of the WS metric values. In step 2105, the routine determines whether the termination condition is satisfied. In step 2106, if satisfied, then the routine continues at step 2107, else the routine loops to step 2102 to continue incrementally improving the layout. In step 2107, the routine calculates the instantaneous rate of improvement of the running minimum. In step 2109, the routine calculates the actual defined rate of improvement. In step 2110, if enough samples have been collected, then the routine is done, else the routine loops to step 2101 to select the next initial layout.

(5) Enhancing the FIR Filter

The technique can improve upon the FIR filter with the generated coefficients by converting it into an IIR filter. The technique adds one or more autoregressive (AR) coefficients (i.e., poles) to the filter. The technique adds the AR coefficients to obtain an optimal tradeoff between confidence and mean lag in the filter. Confidence refers to the degree of certainty that the rate of improvement is not underestimated. In other words, it is the likelihood that the incremental improvements will not terminate prematurely. Mean lag refers to the mean number of incremental steps that elapse between the ideal number at which to terminate and the actual number at which the incremental process is terminated. It is desirable to have a very high confidence and a very small mean lag. However, as the confidence level increases the mean lag also increases. Conversely, as the mean lag decreases the confidence level also decreases. The optimal tradeoff between confidence and mean lag will vary based on the environment in which the WS improvement system is used. However, a function that inputs the confidence and mean lag and outputs a scalar value that rates the inputs based on a tradeoff strategy can be defined for each environment.

The technique employs an iterative, nonlinear minimization approach that varies the values of one or more AR coefficients over a range of stable values until the minimum value of the rating function is achieved. Brent's Method or Powell's Method (for multiple AR coefficients) can be used to minimize the value of the rating function. (See "Numerical Recipes in C," at 402-20.)

Figure 22:
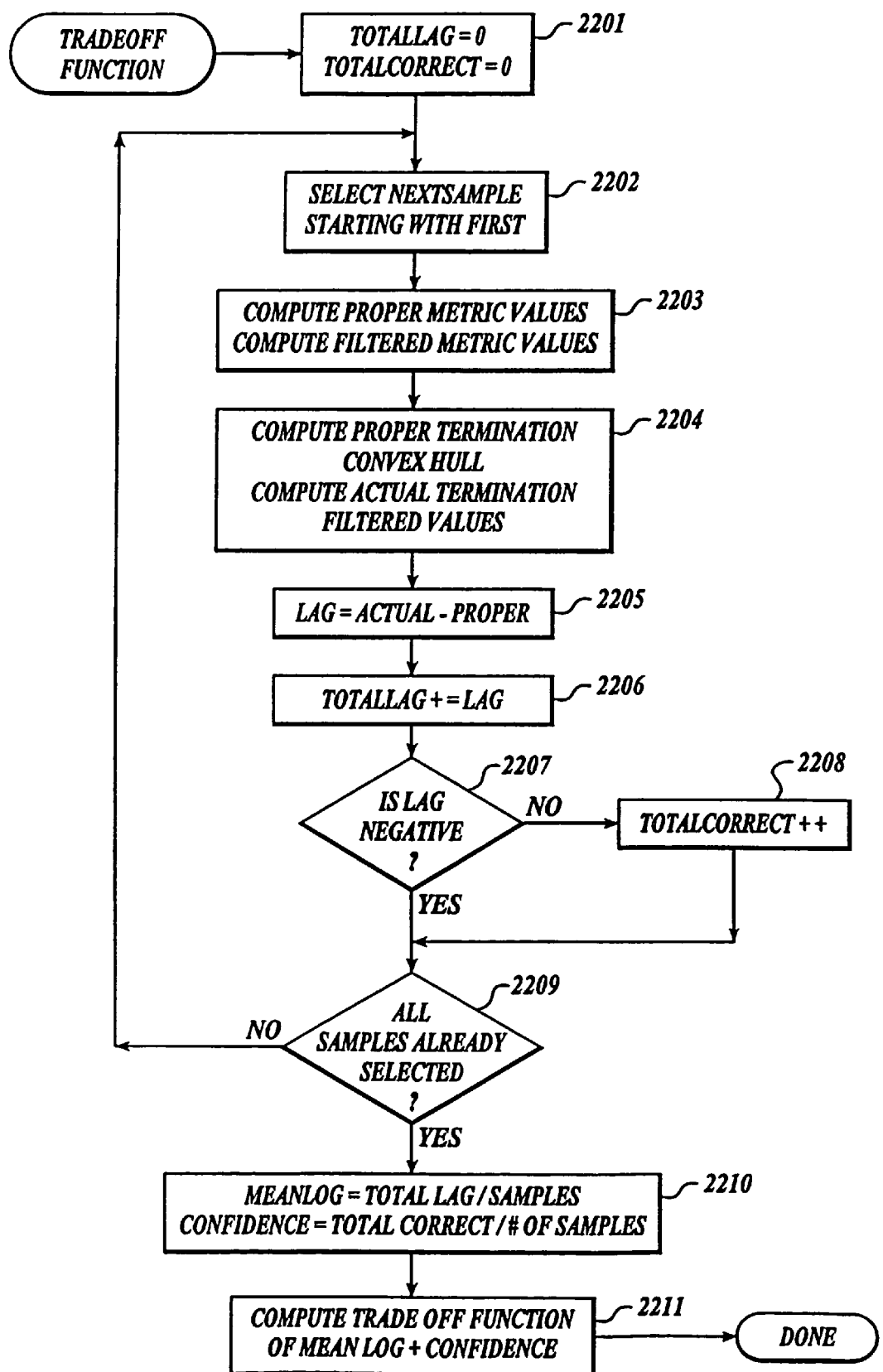
FIG. 22 is a flow diagram of a routine that evaluates a set of AR coefficients.

FIG. 22 is a flow diagram of a routine that evaluates a set of AR coefficients. By repeatedly invoking this routine for various sets of AR coefficients, an optimal set can be identified. This routine calculates the mean lag and confidence based on processing sample runs of the incremental process using the set of AR coefficients. In steps 2201, the routine sets the total lag of all the sample runs to zero and the total count of samples in which the incremental processing is terminated after the ideal incremental step for terminating. In steps 2202-2209, the routine loops selecting various samples and calculating various lag-based statistics. In step 2202, the routine selects the next sample. In step 2203, the routine computes the defined rate of improvement and the filtered rate of improvement (i.e., using the AR coefficients) based on the actual WS metric values for each step. In step 2204, the routine calculates the ideal termination step based on the defined rate of improvement and the actual termination step based on the filtered rate of improvement. In step 2205, the routine calculates the lag. In step 2206, the routine adjusts a running total of the lag. In step 2207, if the lag is negative, then the incremental process would have terminated too early if the filter with the AR coefficients had been used and the routine continues at step 2209, else the routine continues at step 2208. In step 2208, the routine increments the total number of samples in which the termination was not premature. In step 2209, if all the samples have already been selected, then the routine continues at step 2210, else the routine loops to step 2202 to process the next sample. In step 2210, the routine calculates the mean lag as the total lag divided by the number of sample runs and the confidence as the percentage of sample runs in which the termination was not premature. In step 2211, the routine computes a scalar value that rates the desired tradeoff between mean lag and confidence. This scalar value is then used to select the next set of AR coefficients.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A method in a computer system comprising a processor for identifying coefficients for a filter, the filter for filtering results of a function, the method comprising:

using the processor to perform actions, comprising:
collecting sample input values to the filter;
identifying desired output values from the filter for the collected sample input values;
generating a power spectrum of the collected sample input values;
generating a power spectrum of the identified desired output values;
calculating a difference between the generated power spectra;
identifying coefficients that minimize differences between the calculated differences; and
using the identified coefficients within the filter.

2. The method of claim 1 wherein the calculated difference is offset so that the calculated difference at a frequency of zero is zero.

3. The method of claim 1 wherein the results of the function are generated by calculating a working set size of a program image as the working set size is incrementally improved.

4. The method of claim 1 wherein a Levenberg-Marquardt algorithm is used to identify the coefficients.

5. A method in a computer system for identifying coefficients for a finite impulse response filter, the finite impulse response filter for filtering results of a function, the method comprising:

using a processor to perform actions, comprising:
collecting sample input values for a function;
identifying desired output values for the filter for the collected sample input values;
approximating the output values from the input values using a linear fitting technique;
setting the coefficients to values obtained from the linear-fitting technique and
using the coefficients within the finite impulse response filter.

6. The method of claim 5 wherein the results of the function are generated by calculating a working set size of a program image as the working set size is incrementally improved.

7. The method of claim 5 wherein the linear-fitting technique is for a certain-order finite impulse response filter and including determining an error between the approximated output values and the desired output values and when the difference between the determined error and input for the next higher-order finite impulse response filter is not significant using the certain-order finite impulse response filter.

8. The method of claim 7 wherein the significance of the difference between the determined error and input for the next higher-order finite impulse response filter is determined by correlating the determined error with the additional input for the next higher-order finite impulse response filter.

9. A computer-readable storage medium having computer-executable instructions encoded thereon identifying coefficients for a filter, the filter for filtering results of a function, comprising:
at least one of: a first set of computer-executable instructions and a second set of computer-executable instructions:
the first set of computer-executable instructions comprising:
collecting sample input values to the filter;
identifying desired output values from the filter for the collected sample input values;
generating a power spectrum of the collected sample input values;
generating a power spectrum of the identified desired output values;
calculating a difference between the generated power spectra;
identifying coefficients that minimize differences between the calculated differences; and
using the identified coefficients within the filter;
the second set of computer-executable instructions for identifying coefficients for a finite impulse response filter comprising:
collecting sample input values for a function;
identifying desired output values for the filter for the collected sample input values;
approximating the output values from the input values using a linear fitting technique;
setting the coefficients to values obtained from the linear-fitting technique and
using the coefficients within the finite impulse response filter.

10. The computer-readable storage medium of claim 9, wherein the calculated difference is offset so that the calculated difference at a frequency of zero is zero.

11. The computer-readable storage medium of claim 9 wherein the results of the function are generated by calculating a working set size of a program image as the working set size is incrementally improved.

12. The computer-readable storage medium of claim 9 wherein the linear-fitting technique is for a certain-order finite impulse response filter and including determining an error between the approximated output values and the desired output values and when the difference between the determined error and input for the next higher-order finite impulse response filter is not significant using the certain-order finite impulse response filter.

13. The computer-readable storage medium of claim 12 wherein the significance of the difference between the determined error and input for the next higher-order finite impulse response filter is determined by correlating the determined error with the additional input for the next higher-order finite impulse response filter.

14. A system for identifying coefficients for a filter, the filter for filtering results of a function, comprising:
a processor and a computer-readable storage medium, the processor configured to perform at least one of a first set of actions and a second set of actions comprising:
wherein performing the first set of actions, comprises:
collecting sample input values to the filter;
identifying desired output values from the filter for the collected sample input values;
generating a power spectrum of the collected sample input values;
generating a power spectrum of the identified desired output values;
calculating a difference between the generated power spectra;
identifying coefficients that minimize differences between the calculated differences; and
using the identified coefficients within the filter;
wherein performing the second set of actions for identifying coefficients for a finite impulse response filter comprises:
collecting sample input values for a function;
identifying desired output values for the filter for the collected sample input values;
approximating the output values from the input values using a linear fitting technique;
setting the coefficients to values obtained from the linear-fitting technique and
using the coefficients within the finite impulse response filter.

15. The system of claim 14, wherein the calculated difference is offset so that the calculated difference at a frequency of zero is zero.

16. The system of claim 14 wherein the results of the function are generated by calculating a working set size of a program image as the working set size is incrementally improved.

17. The system of claim 14 wherein the linear-fitting technique is for a certain-order finite impulse response filter and including determining an error between the approximated output values and the desired output values and when the difference between the determined error and input for the next higher-order finite impulse response filter is not significant using the certain-order finite impulse response filter.

18. The system of claim 17 wherein the significance of the difference between the determined error and input for the next higher-order finite impulse response filter is determined by correlating the determined error with the additional input for the next higher-order finite impulse response filter.

* * * * *

UNITED STATES PATENT AND TRADEMARK OFFICE
CERTIFICATE OF CORRECTION

| | | |
|---|---|---|
| PATENT NO. | : 7,958,176 B2 | Page 1 of 1 |
| APPLICATION NO. | : 11/407639 | |
| DATED | : June 7, 2011 | |
| INVENTOR(S) | : John R. Douceur et al. | |

It is certified that error appears in the above-identified patent and that said Letters Patent is hereby corrected as shown below:

In column 8, line 46, after "Table 1" insert -- and --.

Signed and Sealed this
Eighteenth Day of October, 2011

David J. Kappos
*Director of the United States Patent and Trademark Office*